United States Patent
Saitoh et al.

(10) Patent No.: US 11,280,944 B2
(45) Date of Patent: Mar. 22, 2022

(54) OPTICAL ELEMENT

(71) Applicant: FUJIFILM Corporation, Tokyo (JP)

(72) Inventors: Yukito Saitoh, Minami-ashigara (JP); Hiroshi Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/930,881

(22) Filed: May 13, 2020

(65) Prior Publication Data
US 2020/0271839 A1 Aug. 27, 2020

Related U.S. Application Data

(63) Continuation of application No. PCT/JP2018/040757, filed on Nov. 1, 2018.

(30) Foreign Application Priority Data

Nov. 13, 2017 (JP) .............................. JP2017-218513
May 18, 2018 (JP) .............................. JP2018-096570

(51) Int. Cl.
*G02B 5/30* (2006.01)
*G02B 5/18* (2006.01)
*G02F 1/13363* (2006.01)

(52) U.S. Cl.
CPC ......... *G02B 5/3016* (2013.01); *G02B 5/1833* (2013.01); *G02F 1/133634* (2013.01); *G02F 1/133636* (2013.01)

(58) Field of Classification Search
CPC ............... G02B 5/3016; G02B 5/1833; G02F 1/133634; G02F 1/133636
See application file for complete search history.

(56) References Cited

U.S. PATENT DOCUMENTS 5,855,971 A * 1/1999 Kobori .................. C09K 19/32
428/1.2
9,158,123 B2 10/2015 Kakubari et al.
(Continued)

FOREIGN PATENT DOCUMENTS

JP 2008-532085 A 8/2008
JP 2010-525394 A 7/2010
(Continued)

OTHER PUBLICATIONS

International Preliminary Report on Patentability, dated May 28, 2020, and English translation of the Written Opinion of the International Searching Authority, dated Jan. 29, 2019, (Forms PCT/IB/326, PCT/IB/373, and PCT/ISA/237) for International Application No. PCT/JP2018/040757.

(Continued)

*Primary Examiner* — Nathanael R Briggs
(74) *Attorney, Agent, or Firm* — Birch, Stewart, Kolasch & Birch, LLP

(57) ABSTRACT

The optical element is an optical element comprising a first optically anisotropic layer which is a cured layer of a liquid crystal composition containing a first disk-like liquid crystal compound, in which the optical element has a liquid crystal alignment pattern in which an optical axis of the first disk-like liquid crystal compound is parallel to a surface of the first optically anisotropic layer, the first optically anisotropic layer is disposed along at least one direction in a plane of the first optically anisotropic layer, and orientation of the optical axis of the first disk-like liquid crystal compound rotationally changes continuously, and the orientation of the optical axis rotates by 180° with a period of 0.5 μm to 5 μm.

1 Claim, 8 Drawing Sheets

(56) References Cited

U.S. PATENT DOCUMENTS

| | | |
|---|---|---|
| 2008/0278675 A1 | 11/2008 | Escuti et al. |
| 2010/0225876 A1 | 9/2010 | Escuti et al. |
| 2012/0086903 A1* | 4/2012 | Escuti .................. G02B 5/3016 |
| | | 349/201 |
| 2016/0011353 A1 | 1/2016 | Escuti et al. |
| 2016/0033698 A1 | 2/2016 | Escuti et al. |
| 2017/0010466 A1 | 1/2017 | Klug et al. |
| 2018/0164480 A1 | 6/2018 | Yoshida |

FOREIGN PATENT DOCUMENTS

| | | |
|---|---|---|
| JP | 2016-519327 A | 6/2016 |
| JP | 2017-522601 A | 8/2017 |
| WO | WO 2012/132194 A1 | 10/2012 |
| WO | WO 2016/194961 A1 | 12/2016 |
| WO | WO 2016/205256 A1 | 12/2016 |

OTHER PUBLICATIONS

International Search Report (Form PCT/ISA/210) for International Application No. PCT/JP2018/040757, dated Jan. 29, 2019, with English translation.
Kobashi et al., "Planar optics with patterned chiral liquid crystals". Nature Photonics, vol. 10, Jun. 2016 (published online Apr. 11, 2016), pp. 389-392, 5 pages total.
Japanese Office Action for Japanese Application No. 2019-552756, dated May 11, 2021, with English translation.

* cited by examiner

OPTICAL ELEMENT

CROSS-REFERENCE TO RELATED APPLICATIONS

This application is a continuation application of International Application No. PCT/JP2018/040757, filed Nov. 1, 2018, the disclosure of which is herein by reference in its entirety. Further, this application claims priority from Japanese Patent Application No. 2017-218513, filed Nov. 13, 2017, and Japanese Patent Application No. 2018-096570, filed May 18, 2018, the disclosures of which are incorporated herein by reference in their entirety.

BACKGROUND OF THE INVENTION

1. Field of the Invention

The present disclosure relates to an optical element which can control a reflection direction of an incidence ray.

2. Description of the Related Art

Since polarized light has been used in various optical devices or systems, there is a demand for an optical element for controlling reflection, focusing, and divergence of polarized light.

JP2016-519327A discloses a polarization conversion system using a geometric phase difference hologram which comprises an anisotropic alignment pattern.

JP2017-522601A discloses a diffractive optical element formed by patterning a thin film which contains a rod-like liquid crystal compound and has optical anisotropy.

"Planar optics with patterned chiral liquid crystal" (Nature Photonics, Kobayashi et al., 2016.66 (2016)) describes that the phase of light reflected by a cholesteric liquid crystal is changed by the phase of a helical structure, and the phase of the helical structure is spatially controlled, and thus the wave surface of the reflected light can be optionally designed.

SUMMARY OF THE INVENTION

An element that changes the alignment pattern of a rod-like liquid crystal compound in the plane to diffract light as described in JP2017-522601A is expected to be applied as an optical member, for example, an augmented reality (AR) video projection device. However, there is a problem in that the diffraction efficiency decreases as the diffraction angle increases, that is, the intensity of diffracted light decreases. JP2017-522601A suggests a method of using a complex layer configuration obtained by forming liquid crystals into multiple layers.

An object of the present disclosure is to provide an optical element which is capable of obtaining diffracted light having high diffraction efficiency with a simple configuration.

According to the present disclosure, there is provided an optical element comprising: a first optically anisotropic layer which is a cured layer of a liquid crystal composition containing a first disk-like liquid crystal compound, in which an optical axis of the first disk-like liquid crystal compound is parallel to a surface of the first optically anisotropic layer and the first optically anisotropic layer has a liquid crystal alignment pattern which is disposed along at least one direction in a plane of the first optically anisotropic layer and in which an orientation of the optical axis of the first disk-like liquid crystal compound rotationally changes continuously, and the orientation of the optical axis rotates by 180° with a period of 0.5 µm to 5 µm.

In the optical element of the present disclosure, an in-plane retardation of the first optically anisotropic layer with respect to light having a wavelength $\lambda$ may be in a range of $0.36\lambda$ to $0.64\lambda$.

In the optical element of the present disclosure, the first disk-like liquid crystal compound in the first optically anisotropic layer may be twistedly aligned in a thickness direction of the first optically anisotropic layer according to a first twist property.

In a case where the first optically anisotropic layer has a twisted alignment according to the first twist property, the optical element of the present disclosure further comprising: a second optically anisotropic layer which is a cured layer of a liquid crystal composition containing a second disk-like liquid crystal compound, in which the optical element has a liquid crystal alignment pattern in which an optical axis of the second disk-like liquid crystal compound is parallel to a surface of the second optically anisotropic layer, the second optically anisotropic layer is disposed along at least one direction in a plane of the second optically anisotropic layer, and orientation of the optical axis of the second disk-like liquid crystal compound rotationally changes continuously, the orientation of the optical axis rotates by 180° with a period of 0.5 µm to 5 µm, and in the second optically anisotropic layer, it is preferable that the second disk-like liquid crystal compound is twistedly aligned in a thickness direction of the second optically anisotropic layer according to a second twist property, and the first twist property and the second twist property exhibit opposite orientation.

In a case where the optical element of the present disclosure comprises the second optically anisotropic layer, it is preferable that an in-plane retardation of the second optically anisotropic layer with respect to light having a wavelength $\lambda$ is in a range of $0.36\lambda$ to $0.64\lambda$.

In a case where the optical element of the present disclosure comprises the first optically anisotropic layer and the second optically anisotropic layer, it is preferable that the first optically anisotropic layer and the second optically anisotropic layer are disposed in a laminated manner.

Alternatively, in the optical element of the present disclosure, the first disk-like liquid crystal compound in the first optically anisotropic layer may be cholesterically aligned in a thickness direction.

The optical element of the present disclosure comprises a first optically anisotropic layer which is a cured layer of a liquid crystal composition containing a first disk-like liquid crystal compound, in which an optical axis of the second disk-like liquid crystal compound is parallel to a surface of the second optically anisotropic layer, the second optically anisotropic layer has a liquid crystal alignment pattern which is disposed along at least one direction in a plane of the second optically anisotropic layer and in which an orientation of the optical axis of the second disk-like liquid crystal compound rotationally changes continuously, and the orientation of the optical axis rotates by 180° with a period of 0.5 µm to 5 µm. With such a configuration, the optical element of the present disclosure is capable of obtaining diffracted light with high diffraction efficiency.

DESCRIPTION OF THE PREFERRED EMBODIMENTS

Hereinafter, embodiments of an optical element according to the present invention will be described with reference to the accompanying drawings. Further, in each drawing, the scales of constituent elements are differentiated from the actual scales as appropriate in order to facilitate visual recognition. Further, the numerical ranges shown using "to" in the present specification indicate ranges including numerical values described before and after "to" as the lower limits and the upper limits. In regard to the angles, the terms "orthogonal" and "parallel" each indicate a range of a strict angle ±10°.

Figure 1:
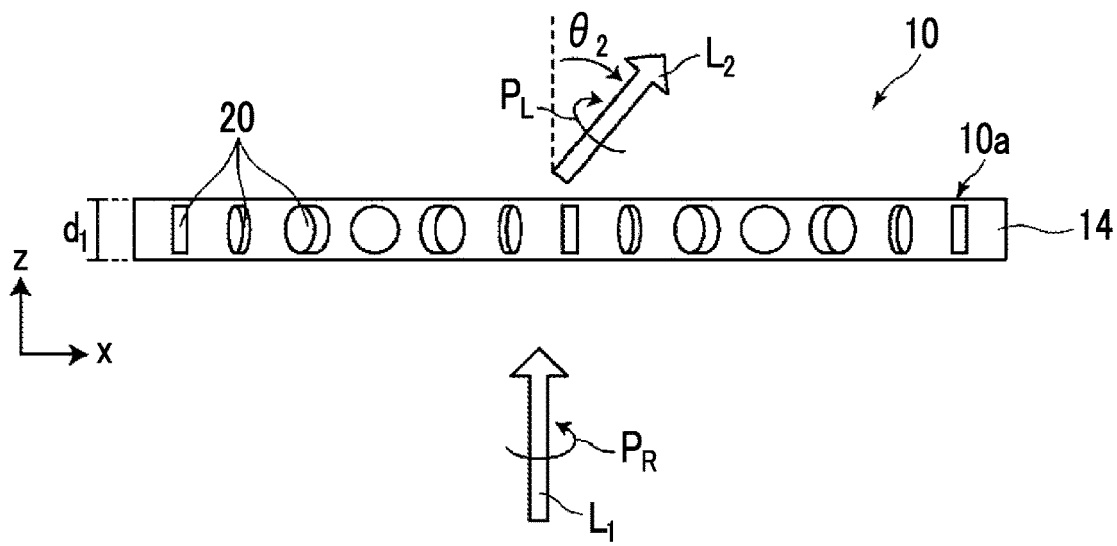
FIG. 1 is a schematic side view illustrating a liquid crystal alignment pattern in an optically anisotropic layer of an optical element according to a first embodiment.
Figure 2:
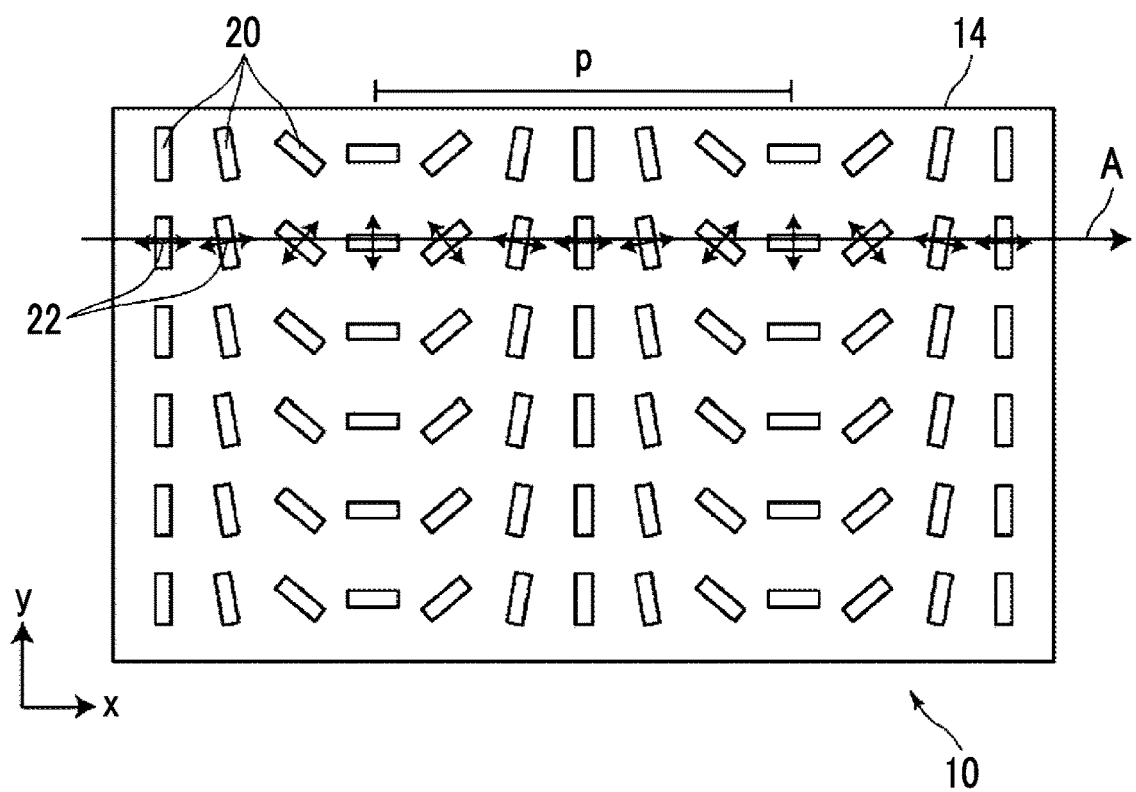
FIG. 2 is a schematic plan view illustrating the liquid crystal alignment pattern in the optically anisotropic layer of the optical element according to the first embodiment.

FIG. 1 is a schematic side view illustrating a liquid crystal alignment pattern in an optical element 10 according to a first embodiment, and FIG. 2 is a schematic plan view illustrating the liquid crystal alignment pattern of the optical element 10 illustrated in FIG. 1. In the drawings, a sheet surface of the sheet-like optical element 10 is defined as an x-y surface, and the thickness direction thereof is defined as a z direction.

The optical element 10 comprises an optically anisotropic layer 14 which is a cured layer of a liquid crystal composition containing a disk-like liquid crystal compound. The first optically anisotropic layer 14 has a liquid crystal pattern in which an optical axis (fast axis) of the disk-like liquid crystal compound is parallel to a surface of the optically anisotropic layer, the optically anisotropic layer is disposed along at least one direction in a plane of the optically anisotropic layer, and orientation of the optical axis of the disk-like liquid crystal compound changes continuously. In addition, the orientation of the optical axis of the disk-like liquid crystal compound constituting the liquid crystal alignment pattern rotates by 180° with a period of 0.5 μm to 5 μm.

In the optical element 10 according to the present embodiment, an in-plane retardation R ($=\Delta n \cdot d_1$) of the optically anisotropic layer 14 with respect to light having a wavelength λ is in a range of 0.36λ to 0.64λ. The retardation R is preferably in a range of 0.4λ to 0.6λ, more preferably in a range of 0.45λ to 0.55λ, and particularly preferably 0.5λ. Further, Δn represents the birefringence of the optically anisotropic layer 14, and $d_1$ represents the thickness of the optically anisotropic layer 14. For example, in a case where light having a wavelength of 550 nm is assumed as an incidence ray, the retardation R with respect to light having a wavelength of 550 nm may be in a range of 198 nm to 352 nm and particularly preferably 275 nm. Since the retardation R is in the above-described range, the optically anisotropic layer 14 functions as a typical λ/2 plate, in other words, has a function of providing a phase difference of 180° ($=\pi=\lambda/2$) between linear polarization components to which the incidence ray is orthogonal. Further, it is preferable that the in-plane retardation is closer to λ/2 from the viewpoint that the diffraction efficiency is improved, but the in-plane retardation is not limited to the above-described range.

The optical element 10 functions as a transmission type diffraction lattice. The principle of functioning as a diffraction lattice will be described.

As illustrated in FIGS. 1 and 2, in the optically anisotropic layer 14, a disk-like liquid crystal compound 20 is fixed by a liquid crystal alignment pattern in which the disk-like liquid crystal compound 20 rotationally changes continuously in one direction (the direction along an axis Z in FIG. 2) in a state where a disk surface thereof rises in a direction (z-axis direction) perpendicular to the surface of the optically anisotropic layer 14. That is, a short axis of the disk-like liquid crystal compound 20 (an axis of the extraordinary light: director), which is defined as an optical axis 22 of the disk-like liquid crystal compound 20, is aligned to be parallel to the surface, and the disk-like liquid crystal compound 20 is aligned such that an angle between an axis A and the optical axis 22 of the disk-like liquid crystal compound 20 disposed along the axis A rotates and changes.

The liquid crystal alignment pattern in which the orientation of the optical axis 22 rotates and changes is a pattern in which the angle between the axis A and the optical axis 22 of the disk-like liquid crystal compound 20 disposed along the axis A varies depending on the position in the axis A direction and the disk-like liquid crystal compound is aligned and fixed such that the angle between the axis A and the optical axis 22 disposed along the axis A gradually changes from φ to φ+180° or φ−180°. Hereinafter, in the optically anisotropic layer as illustrated in FIG. 2, a pattern in which optical axes are aligned such that the orientation of the optical axes rotationally changes continuously in one direction among a plurality of local regions (unit regions) where optical axes of liquid crystals are parallel to the surface of the optically anisotropic layer and the orientation of the optical axes is constant is referred to as a horizontal rotational alignment pattern.

Here, as illustrated in FIGS. 1 and 2, continuous rotation and change may be made by adjacent regions rotating at a constant angle of 30° from 0° to 180° (=0°). The change is gradual in a case where the average value of the orientations of the optical axes in the unit range is linearly changed at a constant rate. Here, a change in inclination of the optical axes in regions that are adjacent to each other in the axis A direction and have different inclinations is 45° or less. However, it is preferable that the change in inclination of adjacent regions decreases.

In the A-axis direction, the distance at which the angle between the optical axis 22 and the A axis changes from $\varphi$ to $\varphi+180°$ or $\varphi-180°$ (returns to the original position) is a period p of 180° rotation (hereinafter, referred to as a rotation period p). The rotation period p of the orientation of the optical axis is in a range of 0.5 µm to 5 µm as described above. Further, the rotation period p may be determined according to the wavelength of light incident on the optical element and the desired emission angle.

The optical element 10 provides a phase difference of $\lambda/2$ to the incidence ray with the configuration of the above-described optically anisotropic layer 14 and emits the incidence ray which has been incident at an incidence angle of 0°, that is, the incidence ray which has been perpendicularly incident at an emission angle $\theta_2$. That is, as illustrated in FIG. 1, in a case where light $L_1$ of right circularly polarized light $P_R$ (hereinafter, referred to as an incidence ray $L_1$) is incident perpendicularly (along the normal line of the surface) to the surface of the optically anisotropic layer 14, light $L_2$ of left circularly polarized light $P_L$ (hereinafter, referred to as emitted light $L_2$) is emitted in a direction forming an angle $\theta_2$ with the normal direction. In a case where light having a predetermined wavelength is incident on the optical element 10, the emission angle $\theta_2$ of the emitted light $L_2$ increases as the rotation period p in the optically anisotropic layer 14 decreases.

Figure 3:
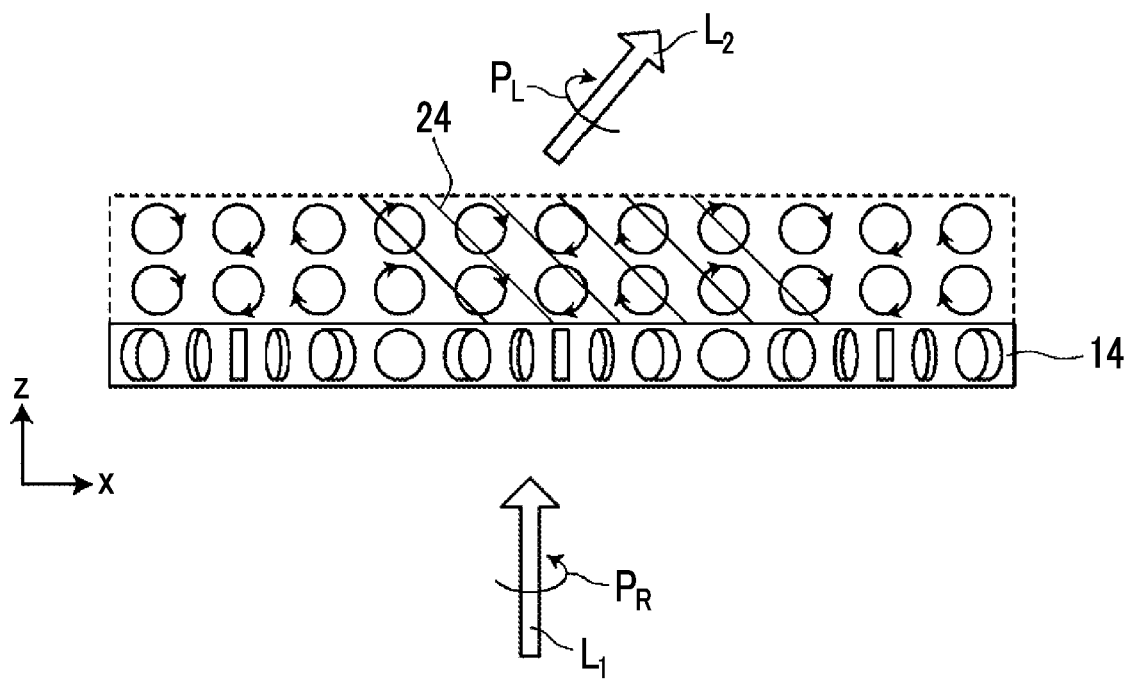
FIG. 3 is a view for explaining the principle that the optically anisotropic layer functions as a diffraction lattice.

FIG. 3 is a view schematically illustrating the principle that the incidence ray $L_1$ perpendicularly incident on the optical element 10 is emitted at a predetermined emission angle $\theta_2$. Hereinafter, the description will be made with reference to FIG. 3.

First, a case where right circularly polarized light $P_R$ having a wavelength $\lambda$ is used as the incidence ray $L_1$ will be described.

By allowing the incidence ray $L_1$ that is right circularly polarized light $P_R$ to pass through the optically anisotropic layer 14, a phase difference of $\lambda/2$ is provided so that the incidence ray $L_1$ is converted into left circularly polarized light $P_L$. In the optically anisotropic layer 14, the absolute phase of the incidence ray $L_1$ is changed due to the optical axis 22 of the disk-like liquid crystal compound 20 in each region of the plane. Here, since the orientation of the optical axis 22 of the disk-like liquid crystal compound 20 rotates and changes in the A-axis direction (the x-axis direction in the present example), the amount of change in absolute phase varies depending on the orientation of the optical axis 22 of the disk-like liquid crystal compound 20 in the x coordinate on the surface (x-y surface) of the optically anisotropic layer 14 on which the incidence ray is incident. In the region indicated by the broken line in FIG. 3, a state in which the amount of change in absolute phase varies depending on the x coordinate is schematically illustrated. As illustrated in FIG. 3, an equiphase surface 24 of the absolute phase with an angle with respect to the surface of the optically anisotropic layer 14 is formed due to deviation of the absolute phase at the time of light passing through the optically anisotropic layer 14. In this manner, a bending force is applied to the incidence ray $L_1$, which has been incident in the normal direction, in a direction perpendicular to the equiphase surface 24 so that the traveling direction of the incidence ray $L_1$ is changed. That is, the incidence ray $L_1$ that is right circularly polarized light $P_R$ becomes left circularly polarized light $P_L$ after passing through the optically anisotropic layer 14 and is emitted from the optically anisotropic layer 14 as emitted light $L_2$ that travels in a direction forming a predetermined angle $\theta_2$ with the normal direction.

As described above, in the optical element 10, the incidence ray $L_1$ which has been perpendicularly incident on the surface of the optical element 10 along the normal direction is emitted as emitted light $L_2$ in a direction different from the normal direction.

The inclination of the emission angle can be changed by changing the rotation period p of the orientation of the optical axis in the liquid crystal alignment pattern in the optically anisotropic layer 14. Since a stronger bending force can be applied to incidence ray as the rotation period p decreases, the inclination can be increased.

As described above, the wave surface of the incidence ray can be changed by changing the amount of change in absolute phase using the liquid crystal alignment pattern in the optically anisotropic layer 14.

In a case where the optical element 10 has a liquid crystal alignment pattern having a uniform rotation period p in only one direction, the conversion of the incidence ray $L_1$ into the emitted light $L_2$ based on the above-described principle can be described as transmission diffraction. The optically anisotropic layer 14 functions as a transmission diffraction lattice with respect to the incidence ray $L_1$, and the incidence ray $L_1$ perpendicularly incident on the optically anisotropic layer 14 is transmitted diffracted as transmitted diffracted light $L_2$ having a predetermined diffraction angle $\theta_2$. In this case, Equation (1) which is a general equation of light diffraction is satisfied.

$$n_2 \sin \theta_2 - n_1 \sin \theta_1 = m\lambda/p \qquad \text{Equation (1)}$$

Here, $n_1$ represents the refractive index of a medium 1 on the incident surface side of the diffraction lattice (here, the optically anisotropic layer), $\theta_1$ represents the incidence angle, $n_2$ represents the refractive index of a medium 2 on the emission surface side of the diffraction lattice (here, the optically anisotropic layer), $\theta_2$ represents the diffraction angle (emission angle), $\lambda$ represents the wavelength, p represents the rotation period, and m represents the order of diffraction. Here, the maximum diffraction efficiency is set to be obtained by setting m to 1. Here, since the incidence angle $\theta_1$ is 0°, Equation (1) becomes Equation (2) of "$n_2 \sin \theta_2 = \lambda/p$".

Figure 4:
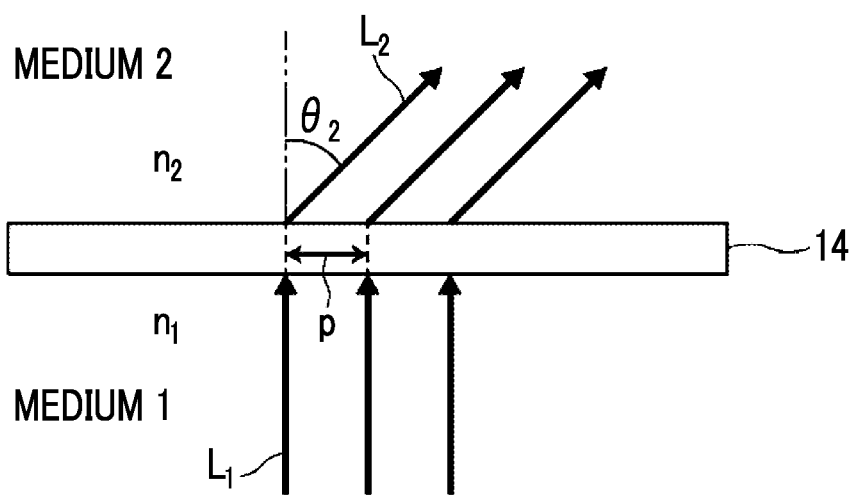
FIG. 4 is a view schematically illustrating a diffraction phenomenon in a diffraction lattice.

FIG. 4 is a view schematically illustrating the diffraction phenomenon represented by Equation (2).

The optically anisotropic layer 14 is disposed as a diffraction lattice between a medium $n_1$ and a medium $n_2$. The light $L_1$ incident on the optically anisotropic layer 14 from the medium 1 side having a refractive index $n_1$ in the normal direction is diffracted by a diffraction action of the optically anisotropic layer 14 and emitted to the medium 2 side having a refractive index $n_2$. At this time, the emitted light $L_2$ emitted at an emission angle $\theta_2$ can be rephrased as transmitted diffracted light $L_2$ at a diffraction angle $\theta_2$.

In this manner, the optically anisotropic layer 14 in which the disk-like liquid crystal compound 20 rotates and is aligned horizontally to be fixed functions as a diffraction lattice.

The present inventors found that the optically anisotropic layer 14 in which the disk-like liquid crystal compound 20 rotates and is aligned horizontally to be fixed is capable of obtaining higher diffraction efficiency as compared with the diffraction lattice using the optically anisotropic layer in which a rod-like liquid crystal compound of the related art rotates and is aligned horizontally to be fixed. Here, the "rod-like liquid crystal compound rotates and is aligned horizontally" means that an optical axis (major axis) of the rod-like liquid crystal compound is parallel to the surface and the optical axis rotates and changes in at least one direction.

The reason why higher diffraction efficiency can be obtained by using the disk-like liquid crystal compound 20 as compared with the case of using the rod-like liquid crystal compound is assumed as follows.

As illustrated in FIG. 3, light which has been perpendicularly incident on the optically anisotropic layer travels obliquely in the optically anisotropic layer in an oblique direction due to application of a bending force. In a case where light travels in the optically anisotropic layer, since deviation from conditions such as the diffraction period which is originally set so as to obtain a desired diffraction angle with respect to the original perpendicular incidence occurs, diffraction loss occurs.

Here, the refractive index of the optically anisotropic layer in the thickness direction is as follows.

The refractive index of the optically anisotropic layer in the thickness direction in which the optical axis rotates and is aligned horizontally to be fixed is a refractive index no of ordinary light, and the refractive index in the in-plane direction is an average value of the refractive index no of ordinary light and a refractive index ne of extraordinary light.

In a case where a disk-like liquid crystal compound is used, since no is greater than ne, the refractive index in the thickness direction is larger than the refractive index in the in-plane direction. Meanwhile, in a case where a rod-like liquid crystal compound is used, since no is less than ne, the refractive index in the thickness direction is smaller than the refractive index in the in-plane direction.

In the case of the disk-like liquid crystal compound, the refractive index sensed at the time of diffracted light obliquely traveling in a liquid crystal medium is larger than that in the case of the rod-like liquid crystal compound. Accordingly, in consideration of Snell's law, light propagates through the liquid crystal medium at an angle smaller than that in the case of the rod-like liquid crystal compound. That is, in the case of the horizontal rotational alignment of the disk-like liquid crystal compound and the horizontal rotational alignment of the rod-like liquid crystal compound having the same rotation period, the inclination of light in the optically anisotropic layer in the traveling direction in the case of the disk-like liquid crystal compound becomes smaller than that in the case of the rod-like liquid crystal compound. Therefore, the deviation from the original diffraction conditions can be suppressed. As the result, higher diffraction efficiency is considered to be obtained in the case where the disk-like liquid crystal compound is used.

The wavelength λ of light that allows the optical element according to the embodiment of the present disclosure to generate a diffraction action may be in a range from ultraviolet to infrared and furthermore, at an electromagnetic wave level. For the same rotation period p, the diffraction angle increases as the wavelength of the incidence ray increases, and the diffraction angle decreases as the wavelength of the incidence ray decreases. In a case where the wavelength λ is 380 nm, higher diffraction efficiency can be obtained as compared with the case of the rod-like liquid crystal compound in a case where the rotation period p (μm) is in a range of 0.5<p<1. Further, in a case where the wavelength λ is 1100 nm, higher diffraction efficiency can be obtained as compared with the case of the rod-like liquid crystal compound in a case where the rotation period p (μm) is in a range of 2<p<5.

As described above, in a case where the light $L_1$ of the right circularly polarized light $P_R$ is incident along the normal line on the surface of the optical element 10, the light $L_2$ of the left circularly polarized light $P_L$ is emitted in a direction forming an angle $\theta_2$ with the normal direction, as illustrated in FIG. 1. Meanwhile, in a case where the left circularly polarized light is incident on the optical element 10 as the incidence ray, the incidence ray is converted into right circularly polarized light in the optically anisotropic layer 14 and receives a bending force in a direction opposite to that of FIG. 1 so that the traveling direction is changed.

Figure 5:
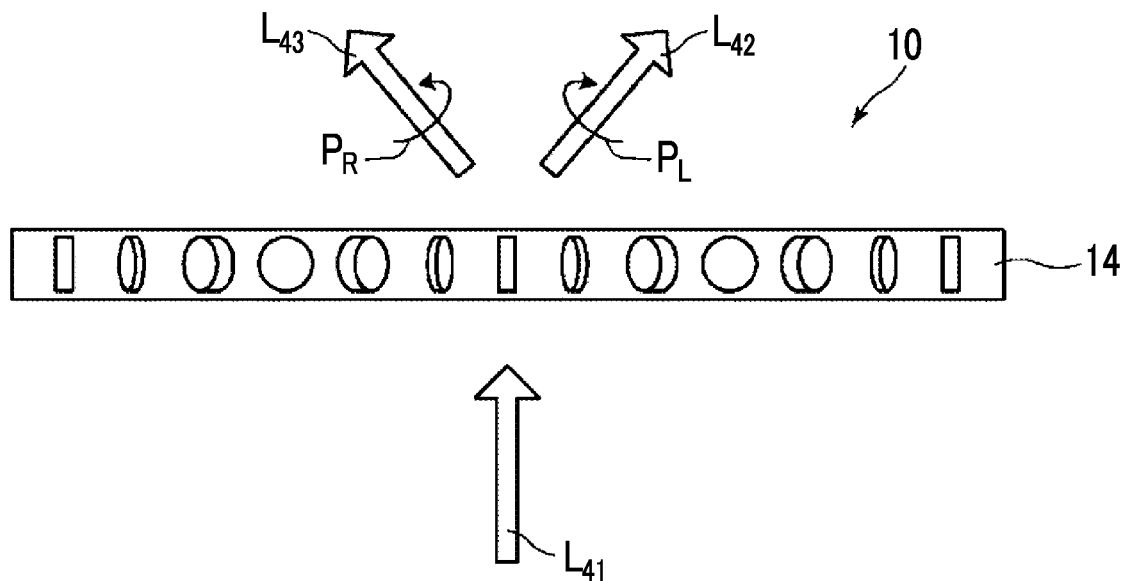
FIG. 5 is a view for explaining emitted light in a case where randomly polarized light is incident on the optical element according to the first embodiment.

As illustrated in FIG. 5, in a case where an incidence ray $L_{41}$ of randomly polarized light (that is, non-polarized light) is incident on the optical element 10, right circularly polarized light $P_R$ among the incidence ray $L_{41}$ receives a bending force due to the liquid crystal alignment pattern so that the traveling direction is changed, is transmitted through the optically anisotropic layer, and is emitted as first transmitted diffracted light $L_{42}$. By allowing the right circularly polarized light $P_R$ to pass through the optically anisotropic layer 14, the right circularly polarized light $P_R$ is converted into left circularly polarized light $P_L$ and emitted. The left circularly polarized light $P_L$ among the incidence ray $L_{41}$ is transmitted through the optically anisotropic layer 14 in a state in which the left circularly polarized light receives a bending force in a direction opposite to that of the light converted from right circularly polarized light to left circularly polarized light so that the traveling direction is changed, and the left circularly polarized light is emitted as second transmitted diffracted light $L_{43}$ from the surface opposite to the optical element 10. The left circularly polarized light $P_L$ is converted into right circularly polarized light $P_R$ by the optically anisotropic layer 14 and emitted. Further, the traveling direction of the first transmitted light $L_{42}$ and the traveling direction of the second transmitted light $L_{43}$ are line-symmetric with respect to the normal line.

Figure 6:
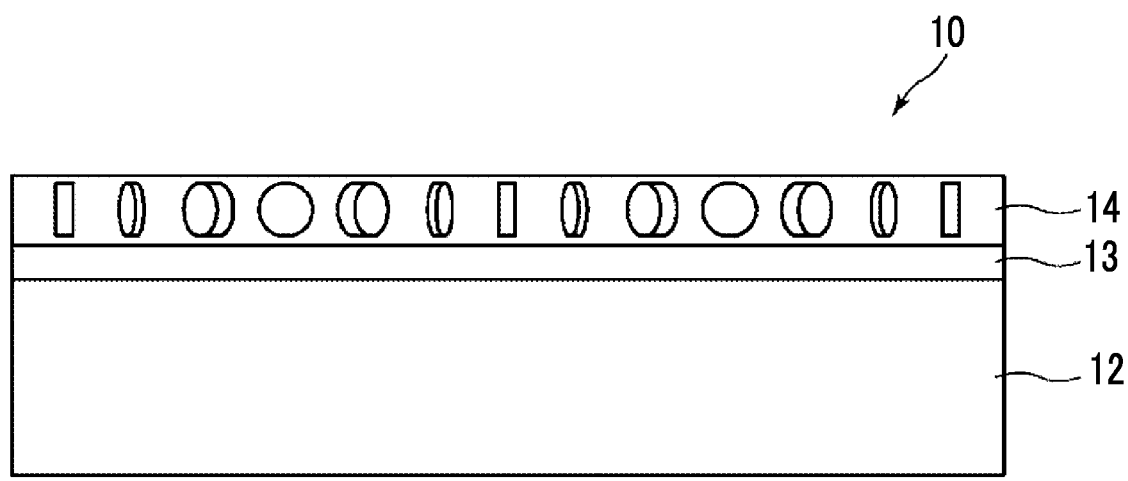
FIG. 6 is a schematic side view illustrating a laminated structure of a design change example of the optical element according to the first embodiment.

Further, as illustrated in FIG. 6, the optical element 10 may have a configuration in which an alignment film 13 is comprised on a support 12 and the optically anisotropic layer 14 is comprised thereon.

In the optical element according to the embodiment of the present disclosure, the above-described 180° rotation period in the optically anisotropic layer does not need to be uniform over the entire surface. Further, the optical element may have the liquid crystal alignment pattern in a portion, in which the orientation of the optical axis rotates in at least one direction (A axis) in the plane of the optically anisotropic layer, and may comprise a portion where the orientation of the optical axis is constant.

In the description above, the example in which the incidence ray is perpendicularly incident on the optically anisotropic layer has been described. However, in a case where the incidence ray is oblique, the effect of transmission diffraction can be similarly obtained. In a case of oblique incidence, the rotation period may be designed such that Equation (1) is satisfied in consideration of the incident angle $\theta_1$ to obtain a desired diffraction angle $\theta_2$.

As in the optically anisotropic layer 14 of the optical element 10 illustrated in FIGS. 1 and 2, in a case where the liquid crystal alignment pattern in which the optical axis parallel to the surface rotates and changes with a constant 180° rotation period in one direction of the plane is uniformly comprised in the plane, the emission direction is determined as one direction.

Further, in the liquid crystal alignment pattern, the direction in which the optical axis rotates and changes is not limited to one direction and may be two directions or a plurality of directions. By using the optically anisotropic layer 14 comprising the liquid crystal alignment pattern according to the orientation of desired reflected light, the incidence ray can be reflected in a desired direction.

Figure 7:
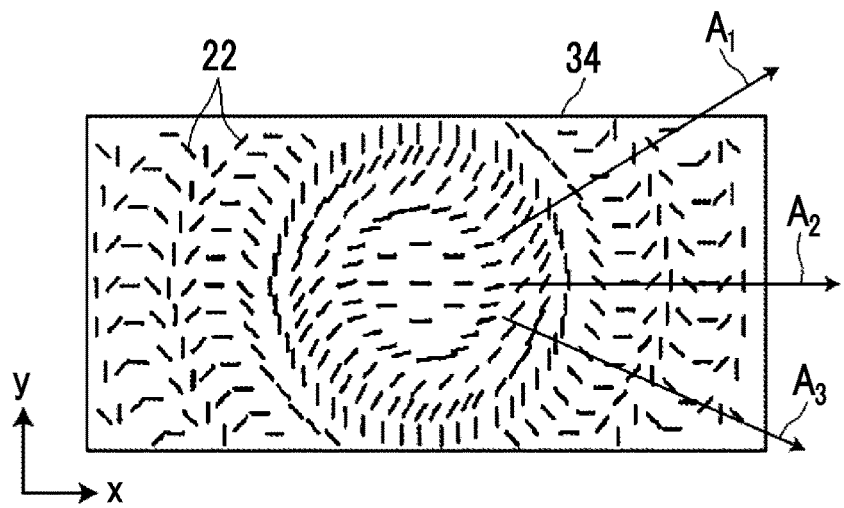
FIG. 7 is a schematic plan view illustrating a horizontal rotational alignment pattern in another design change example of the optical element.

FIG. 7 is a schematic plan view illustrating an optically anisotropic layer 34 in a design change example of the optical element. The liquid crystal alignment pattern in the optically anisotropic layer 34 is different from the liquid crystal alignment pattern in the optically anisotropic layer 14 of the embodiment. FIG. 7 illustrates only the optical axis 22. The optically anisotropic layer 34 of FIG. 7 has a liquid crystal alignment pattern in which the orientation of the optical axis 22 gradually rotates and changes along, for example, axes $A_1$, $A_2$, $A_3$, . . . , and the like in multiple directions from the center side to the outside. The absolute phase of the incidence ray changes in different amounts of change between local regions where the orientation of the optical axis 22 varies due to the liquid crystal alignment pattern illustrated in FIG. 7. In a case where the optical element comprises the liquid crystal alignment pattern in which the optical axis radially rotates and changes as illustrated in FIG. 7, light can be reflected as divergent light or focused light. That is, the function as a concave lens or a convex lens can be realized by the liquid crystal alignment pattern in the optically anisotropic layer 14.

Figure 8:
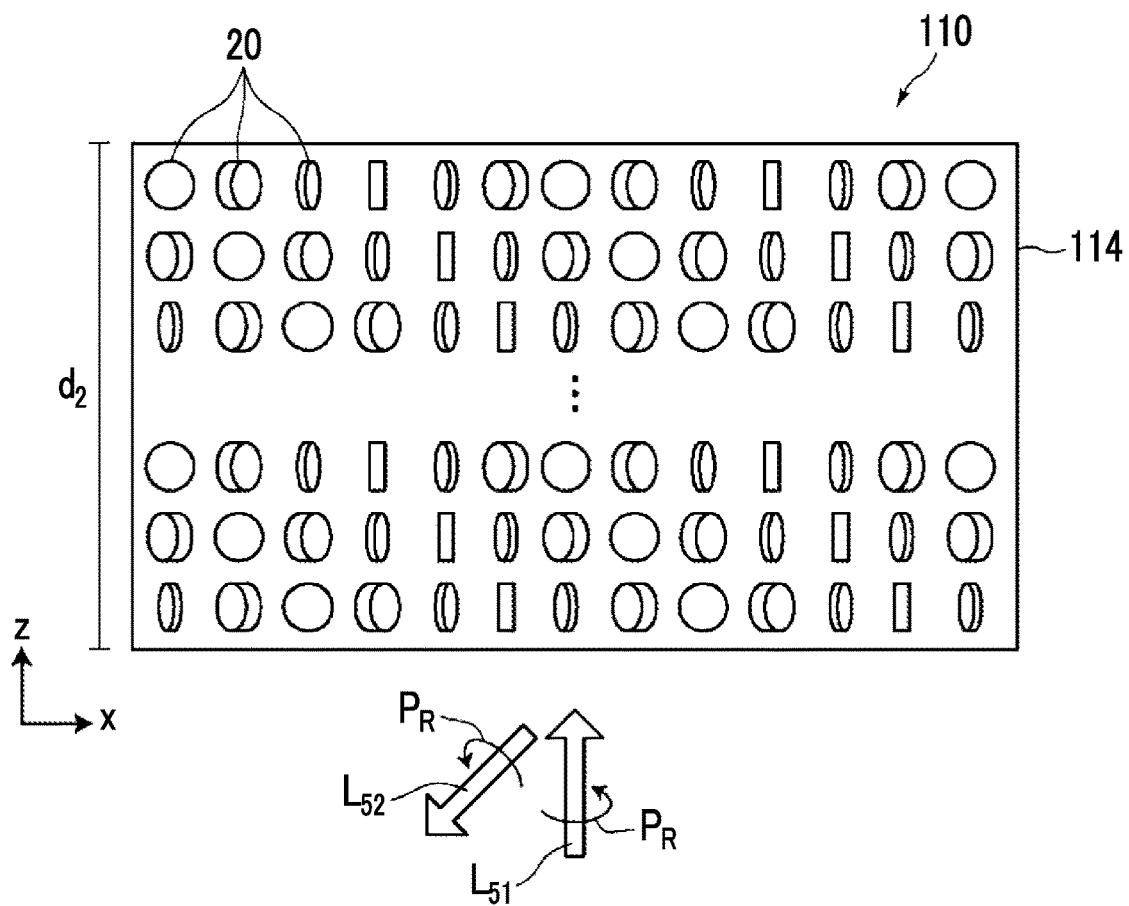
FIG. 8 is a schematic side view illustrating a liquid crystal alignment pattern in an optically anisotropic layer of an optical element according to a second embodiment.

FIG. 8 is a schematic side view illustrating the configuration of the optical element 110 according to a second embodiment of the present invention. The schematic plan view of the liquid crystal alignment pattern in the plane of the optically anisotropic layer of the optical element according to the second embodiment is the same as that of the first embodiment illustrated in FIG. 2.

An optical element 110 according to the second embodiment comprises an optically anisotropic layer 114. The optical element 110 of the present embodiment may also have a configuration in which an optically anisotropic layer is formed on an alignment film which has been formed on a support.

In the optical element 110, the liquid crystal alignment pattern of the optically anisotropic layer 114 in the thickness direction is different from that of the optically anisotropic layer 14 according to the first embodiment. The optically anisotropic layer 114 is different from the optically anisotropic layer 14 in terms that the disk-like liquid crystal compound 20 is cholesterically aligned in the thickness direction.

The optically anisotropic layer 114 has a function of selectively reflecting only light in a predetermined selected wavelength range of specific circularly polarized light (right circularly polarized light or left circularly polarized light). The center wavelength of light that is selectively reflected is determined by a cholesteric helical pitch and a film thickness $d_2$, and which of the left and right circularly polarized light is reflected is determined by the rotation direction of the helix.

Since the change of the optical axis 22 in the present optical element 110 in the in-plane direction is the same as in the case of the optical element 10 according to the first embodiment illustrated in FIG. 2, the same action as in the case of the optical element 10 is generated. Therefore, similar to the optical element 10 according to the first embodiment, the optical element 110 generates an action of changing the absolute phase of the incidence ray and bending the light obliquely. At the same time, since the optically anisotropic layer has a cholesteric phase in the thickness direction, the layer selectively reflects light in a selected wavelength range of a specific circularly polarized light among light incident on the optically anisotropic layer.

Here, the optical element is designed such that the cholesteric phase in the optically anisotropic layer 114 reflects right circularly polarized light having a predetermined center wavelength. Here, as illustrated in FIG. 8, in a case where light $L_{51}$ having a predetermined center wavelength, which is right circularly polarized light, is perpendicularly incident on the surface of the optically anisotropic layer 114 of the optical element 110, that is, along the normal line, reflected light $L_{52}$ traveling in a direction inclined with respect to the normal direction is generated. That is, the optically anisotropic layer 114 functions as a reflection type diffraction lattice for the light $L_{51}$.

Further, light outside the predetermined selected wavelength range and left circularly polarized light are transmitted through the optically anisotropic layer 114.

Figure 9:
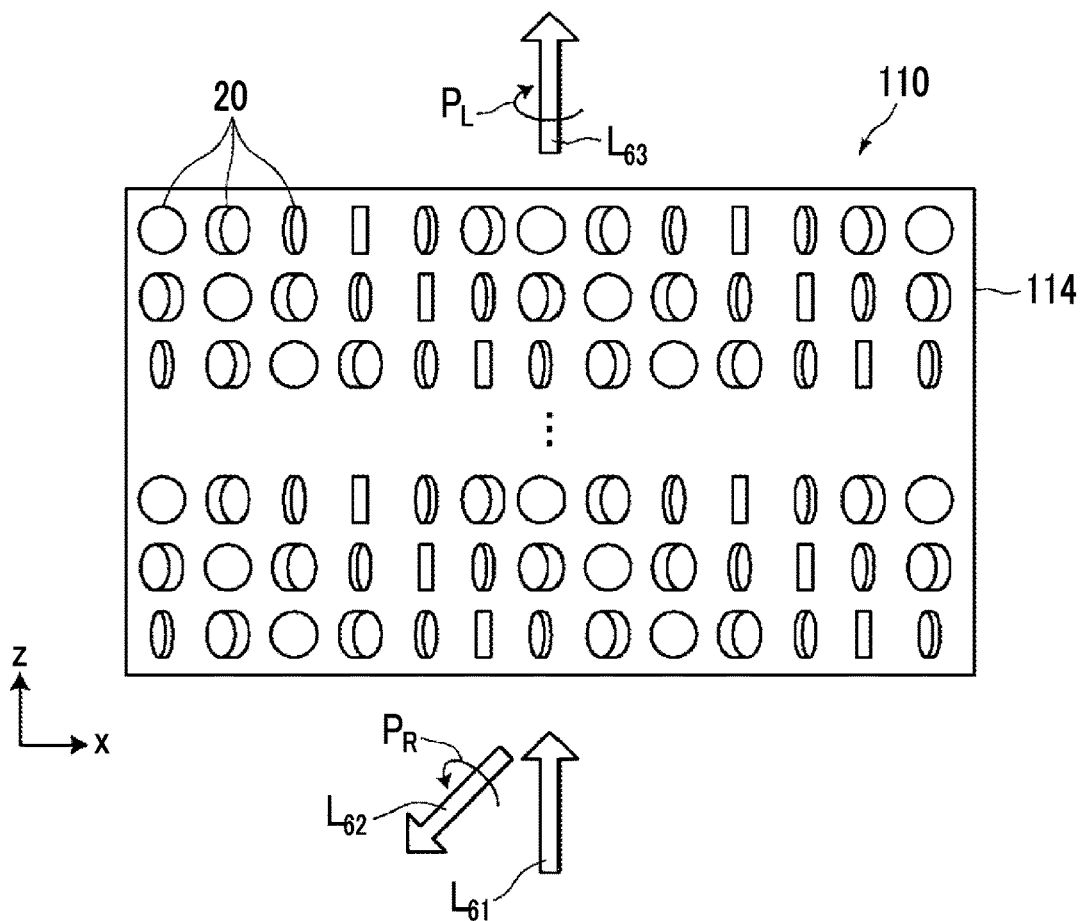
FIG. 9 is a view illustrating reflected light and transmitted light in a case where an incidence ray of randomly polarized light is incident on the optical element according to the second embodiment.

Therefore, as illustrated in FIG. 9, in a case where randomly polarized light $L_{61}$ having a predetermined center wavelength is perpendicularly incident on the optically anisotropic layer 114, only right circularly polarized light $L_{62}$ is reflected and diffracted, and left circularly polarized light $L_{63}$ is transmitted through the optically anisotropic layer 114.

Similarly to the optical element 10 according to the first embodiment, the optical element 110 of the present embodiment is capable of improving the diffraction efficiency as compared with the case where the liquid crystal alignment pattern which is the horizontal rotational alignment and has a cholesteric phase in the thickness direction is formed by the rod-like liquid crystal compound.

Further, the optical element may comprise a combination of a plurality of optically anisotropic layers having a cholesteric phase in different selected wavelength ranges.

Figure 10:
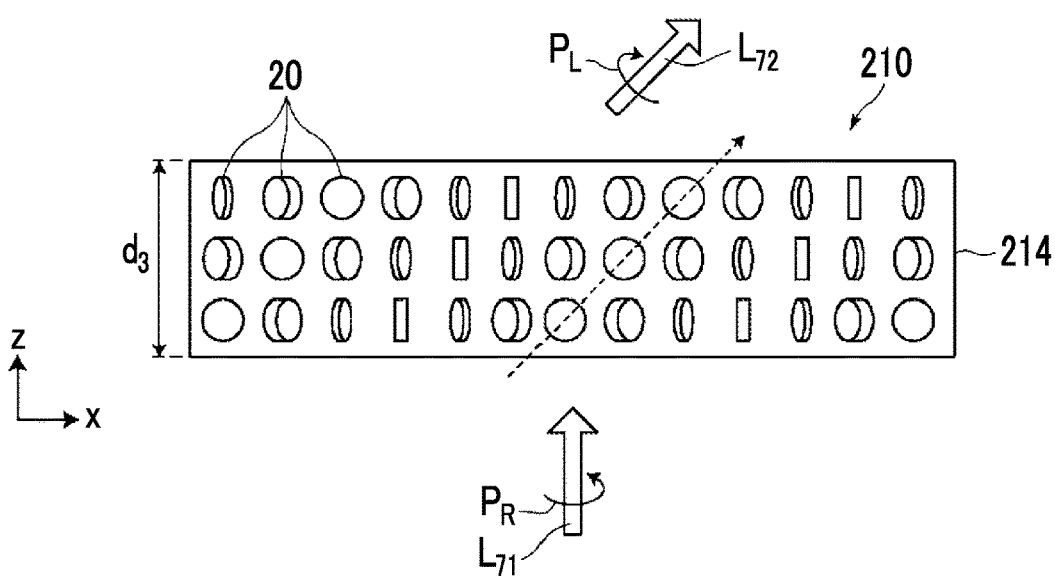
FIG. 10 is a schematic side view illustrating a liquid crystal alignment pattern in an optically anisotropic layer of an optical element according to a third embodiment.

FIG. 10 is a schematic side view illustrating the configuration of an optical element 210 according to a third embodiment of the present invention.

The optical element 210 according to the third embodiment comprises an optically anisotropic layer 214. The optical element 210 according to the present embodiment may also have a configuration in which an optically anisotropic layer is formed on an alignment film which has been formed on a support. Further, the liquid crystal alignment pattern in the plane of the optically anisotropic layer 214 of the optical element 210 according to the third embodiment is substantially the same as that of the optically anisotropic layer 14 according to the first embodiment, and the schematic plan view is the same as FIG. 2 illustrating the first embodiment.

In the optical element 210, the liquid crystal alignment pattern of the optically anisotropic layer 214 in the thickness direction is different from that of the optically anisotropic layer 14 according to the first embodiment. The optically anisotropic layer 214 is different from the optically anisotropic layer 14 in terms that the disk-like liquid crystal compound 20 is twistedly aligned in the thickness direction according to the twist property. The "disk-like liquid crystal compound 20 is twistedly aligned in the thickness direction" means that the orientation of the optical axes of the plurality of disk-like liquid crystal compounds 20 arranged in the thickness direction from one surface of the optically anisotropic layer 214 to the other surface is relatively changed and is twistedly aligned in one direction. The twist property is classified into a right twist property and a left twist property and may be applied according to the polarization of light intended to be diffracted.

As described above, the optical element 110 according to the second embodiment is cholesterically aligned in the thickness direction and functions as a reflection type diffraction lattice that selectively reflects only light in a specific selected wavelength range of specific circularly polarized light. The cholesteric alignment is helical alignment in which the disk-like liquid crystal compound 20 rotates in the thickness direction, and the disk-like liquid crystal compound 20 rotates once or more times in the thickness direction. On the contrary, in the optically anisotropic layer 214, the twist of the disk-like liquid crystal compound in the thickness direction is less than one rotation, that is, the twist angle is less than 360°. For example, in the example of FIG. 10, the optical axis of the disk-like liquid crystal compound 20 rotates by approximately 60° from one surface side to the other surface side in the thickness direction (z direction). The twist angle of the disk-like liquid crystal compound 20 in the thickness direction is preferably in a range of 45° to 90°. Specific circularly polarized light in a specific wavelength range is reflected in a case of the cholesteric alignment, but reflection does not occur in a case of twisted alignment.

In the optically anisotropic layer 214 of the example illustrated in FIG. 10, the disk-like liquid crystal compound 20 is aligned so as to be left-twisted from the light incident side to the light emitting side in the thickness direction, that is, from the bottom to the top on the paper surface. Since the disk-like liquid crystal compound 20 rotates and is aligned horizontally in the plane and is left-twisted in the thickness direction, the optical element has an alignment pattern in which regions where the orientations of the optical axes of the disk-like liquid crystal compound 20 are the same are present in the direction indicated by the broken arrow in FIG. 10.

As for a thickness $d_3$ of the optically anisotropic layer 214, in a case where $\Delta n$ represents the birefringence of the optically anisotropic layer 214, the in-plane retardation R ($=\Delta n \cdot d_3$) is in a range of $0.36\lambda$ to $0.64\lambda$. The retardation R is preferably in a range of $0.4\lambda$ to $0.6\lambda$ more preferably in a range of $0.45\lambda$ to $0.55\lambda$ and particularly preferably $0.5\lambda$. That is, similarly to the case of the optically anisotropic layer 14 according to the first embodiment, the optically anisotropic layer 214 functions as a $\lambda/2$ plate.

The optical element 210 in which the twist of the disk-like liquid crystal compound in the thickness direction is less than one rotation functions as a transmission type diffraction lattice, similarly to the optical element 10 according to the first embodiment. That is, the optical element 210 bends light, which has been incident from one surface, obliquely and emits the light as diffracted light from the other surface.

As illustrated in FIG. 10, in a case where light $L_{71}$ of right circularly polarized light $P_R$ (hereinafter, referred to as an incidence ray $L_{71}$) is incident on one surface of the optical element 210, the incidence ray $L_{71}$ is bent in one direction due to the action of the horizontal rotational alignment of the disk-like liquid crystal compound, and light $L_{72}$ of left circularly polarized light $P_L$ is emitted from the other surface due to the action of the $\lambda/2$ plate. At this time, in a case where the orientation of the optical axis of the disk-like liquid crystal compound does not change in the thickness direction as in the optically anisotropic layer 14 according to the first embodiment, the incidence ray $L_{71}$ which has been bent in an oblique direction passes through sites with different amounts of change in absolute phase. Since the incidence ray $L_{71}$ passes through a site where the amount of change in absolute phase is different from the amount of change in initial absolute phase, deviation occurs in the traveling direction of the light, and thus diffraction loss is occurs. Meanwhile, in the present optically anisotropic layer 214, regions where the orientations of the optical axes of the disk-like liquid crystal compound are the same in the direction indicated by the broken arrow are present. In addition, since regions where the orientations of the optical axes are the same in the traveling direction of the bent incidence ray $L_{71}$, the diffraction loss can be reduced, and the diffraction efficiency can be further increased. In addition, it is preferable that the direction indicated by the broken arrow and the traveling direction of the bent incidence ray $L_{71}$ match each other. However, both directions do not necessarily completely match each other. In a case where the direction in which the regions having the same absolute phase are present is a direction which is inclined from the thickness direction and is closer to the traveling direction of the bent light than to the thickness direction, the effect of improving the diffraction efficiency is exhibited.

Figure 11:
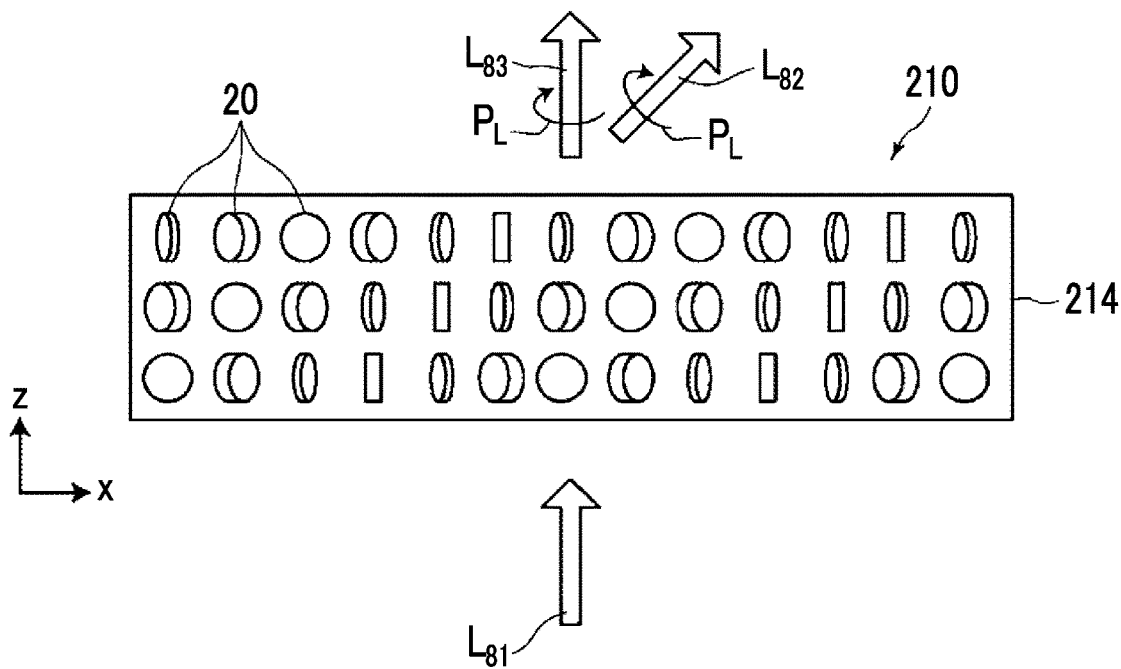
FIG. 11 is a view illustrating emitted light in a case where an incidence ray of randomly polarized light is incident on the optical element according to the third embodiment.

As illustrated in FIG. 11, in a case where an incidence ray $L_{81}$ of randomly polarized light is incident on the optical element 210, right circularly polarized light $P_R$ among the incidence ray $L_{81}$ receives a bending force due to the liquid crystal alignment pattern so that the traveling direction is changed, is transmitted through the optically anisotropic layer 214, and is emitted as first transmitted diffracted light $L_{82}$. At this time, the light is converted into left circularly polarized light $P_L$ in the optically anisotropic layer 214. In addition, the left circularly polarized light $P_L$ among the incidence ray $L_{81}$ has a bending force offset by the horizontal rotational alignment in the in-plane direction and the twisted alignment in the thickness direction, and the left circularly polarized light $P_L$ travels straight without being affected by the alignment pattern of the disk-like liquid crystal compound and is emitted as emitted light $L_{83}$. Further, the optically anisotropic layer does not generate the action of $\lambda/2$ with respect to the left circularly polarized light $P_L$, and the left circularly polarized light $P_L$ is emitted as the left circularly polarized light $P_L$. That is, the optical element 210 acts as a diffraction lattice and a $\lambda/2$ plate only for the right circularly polarized light $P_R$.

In a case of an optically anisotropic layer having a right twist property opposite to the twist property of the disk-like liquid crystal compound 20 in the thickness direction in the optically anisotropic layer 214 illustrated in FIGS. 10 and 11, an alignment pattern in which regions where the orientations of the optical axes of the disk-like liquid crystal compound 20 are the same are present in a left obliquely upward direction is formed. Therefore, contrary to the optical element 210, in a case where the left circularly polarized light $P_L$ is incident, the incidence ray is bent and travels in a left obliquely upward direction on the paper surface, is affected by the $\lambda/2$ plate, and is emitted as transmitted diffracted light of right circularly polarized light $P_R$. Here, in a case where the right circularly polarized light $P_R$ is incident, the right circularly polarized light $P_R$ travels straight and is emitted as the right circularly polarized light $P_R$ without being affected by diffraction and $\lambda/2$.

Figure 12:
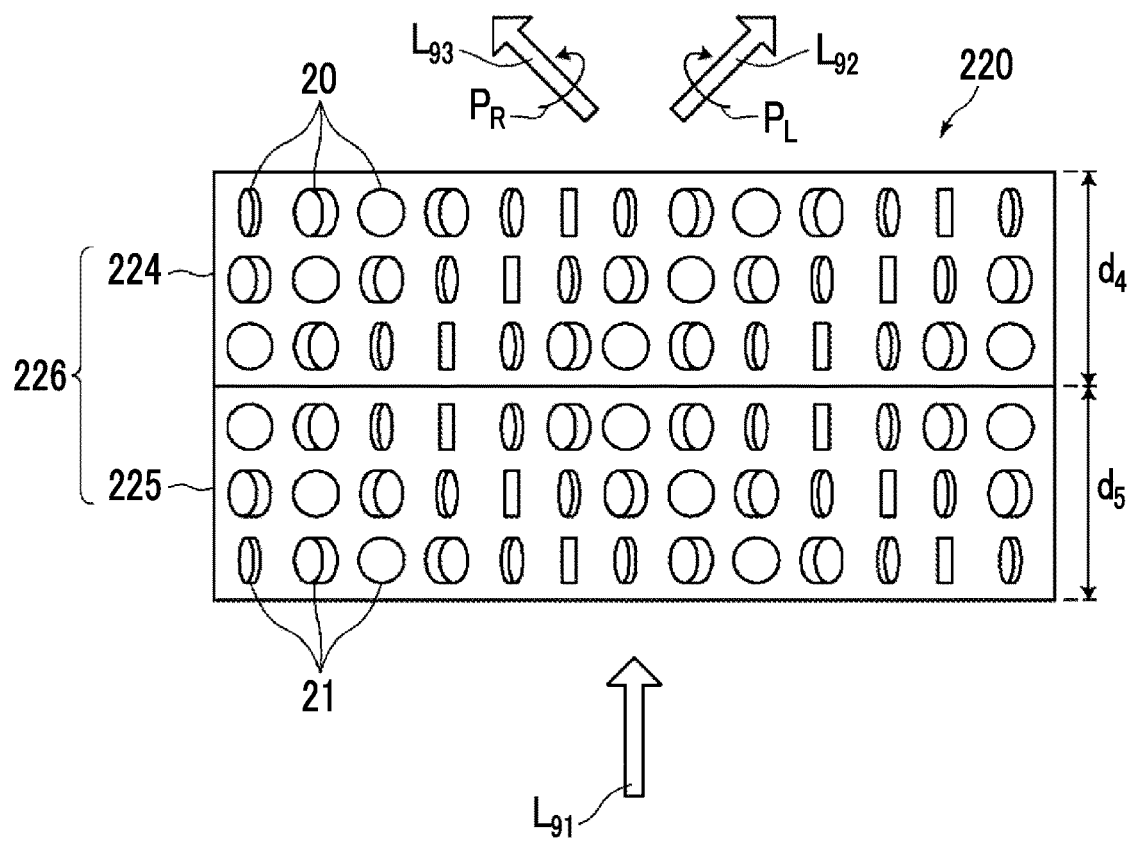
FIG. 12 is a schematic side view illustrating a liquid crystal alignment pattern in an optically anisotropic layer of an optical element according to a fourth embodiment.

FIG. 12 is a schematic side view illustrating a configuration of an optical element 220 according to a fourth embodiment of the present invention.

The optical element 220 according to the fourth embodiment comprises a first optically anisotropic layer 224 which is a cured layer of a liquid crystal composition containing a first disk-like liquid crystal compound, and a second optically anisotropic layer 225 which is a cured layer of a liquid crystal composition containing a second disk-like liquid crystal compound.

The first optically anisotropic layer 224 has a liquid crystal alignment pattern in which the optical axis of the first disk-like liquid crystal compound 20 is parallel to the surface of the first optically anisotropic layer 224, the first optically anisotropic layer 224 is disposed along at least one direction in the plane of the first optically anisotropic layer 224, and the orientation of the optical axis of the first disk-like liquid crystal compound 20 rotationally changes continuously. The orientation of the optical axis rotates by 180° with a period of 0.5 µm to 5 µm. Further, in the first optically anisotropic layer 224, the first disk-like liquid crystal compound 20 is twistedly aligned in the thickness direction according to the first twist property.

The second optically anisotropic layer 225 has a liquid crystal alignment pattern in which the optical axis of the second disk-like liquid crystal compound 21 is parallel to the surface of the second optically anisotropic layer 225, the second optically anisotropic layer 225 is disposed along at least one direction in the plane of the second optically anisotropic layer 225, and the orientation of the optical axis of the second disk-like liquid crystal compound 21 rotationally changes continuously. The orientation of the optical axis rotates by 180° with a period of 0.5 µm to 5 µm. Further, in the second optically anisotropic layer 225, the second disk-like liquid crystal compound 21 is twistedly aligned in the thickness direction according to the second twist property. Further, the second twist property of the second optically anisotropic layer 225 and the first twist property of the first optically anisotropic layer 224 exhibit opposite orientation.

The optical element 220 comprises an optically anisotropic layer 226 in which the first optically anisotropic layer 224 and the second optically anisotropic layer 225 are laminated.

In the first optically anisotropic layer 224, an in-plane retardation R ($=\Delta n_4 \cdot d_4$) with respect to light having a first wavelength $\lambda_1$ may be in a range of $0.36\lambda_1$ to $0.64\lambda_1$. The in-plane retardation R is preferably in a range of $0.4\lambda_1$ to $0.6\lambda_1$, more preferably in a range of $0.45\lambda_1$ to $0.55\lambda_1$, and particularly preferably $0.5\lambda_1$. $\Delta n_4$ represents the birefringence of the first optically anisotropic layer 224, and $d_4$ represents the thickness of the first optically anisotropic layer 224.

In the second optically anisotropic layer 225, an in-plane retardation R ($=\Delta n_5 \cdot d_5$) with respect to light having a second wavelength $\lambda_2$ may be in a range of $0.36\lambda_2$ to $0.64\lambda_2$. The in-plane retardation R is preferably in a range of $0.4\lambda_2$ to $0.6\lambda_2$, more preferably in a range of $0.45\lambda_2$ to $0.55\lambda_2$, and particularly preferably $0.5\lambda_2$, $\Delta n_5$ represents the birefringence of the second optically anisotropic layer 225, and $d_5$ represents the thickness of the second optically anisotropic layer 225.

The first wavelength $\lambda_1$ and the second wavelength $\lambda_2$ may be the same as or different from each other. In this example, the first wavelength $\lambda_1$ and the second wavelength $\lambda_2$ are the same and each function as a λ/2 plate. In this case, the first optically anisotropic layer 224 and the second optically anisotropic layer 225 each independently act on the same wavelength λ as a polarized light diffraction lattice.

The first optically anisotropic layer 224 functions as a diffraction lattice and functions as a λ/2 plate with respect to the incidence ray that is right circularly polarized light $P_R$. In addition, the first optically anisotropic layer 224 does not function as a diffraction lattice or a λ/2 plate with respect to the incidence ray that is left circularly polarized light $P_L$.

The second optically anisotropic layer 225 has a twist property opposite to the twist property of the first optically anisotropic layer 224 in the thickness direction. Here, the second optically anisotropic layer 225 comprises an alignment pattern in which the disk-like liquid crystal compound 20 is right-twisted and aligned in the thickness direction. Therefore, the second optically anisotropic layer 225 functions as a diffraction lattice and functions as a λ/2 plate with respect to the incidence ray that is left circularly polarized light $P_L$. In addition, the second optically anisotropic layer 225 does not function as a diffraction lattice or a λ/2 plate with respect to the incidence ray that is right circularly polarized light $P_R$.

The optically anisotropic layer 226 is a laminate of the first optically anisotropic layer 224 and the second optically anisotropic layer 225 and comprises characteristics of both layers. Therefore, the first optically anisotropic layer 224 acts on the right circularly polarized light $P_R$, and the second optically anisotropic layer 225 acts on the left circularly polarized light $P_L$. Consequently, the incidence ray of the right circularly polarized light $P_R$ which has been perpendicularly incident from one surface of the optically anisotropic layer 226 is obliquely diffracted rightward and is emitted as the left circularly polarized light $P_L$ from the other surface. The incidence ray of the left circularly polarized light $P_L$ which has been perpendicularly incident from one surface of the optically anisotropic layer 226 is diffracted obliquely leftward and is emitted as the right circularly polarized light $P_R$.

As illustrated in FIG. 12, a case in which an incidence ray $L_{91}$ of randomly polarized light is perpendicularly incident on one surface of the optically anisotropic layer 226 will be described. In this case, a right circularly polarized light $P_R$ component among the incidence ray $L_{91}$ passes through the second optically anisotropic layer 225, receives a bending force in the first optically anisotropic layer 224 so that the traveling direction is changed, and is emitted from the other surface of the optically anisotropic layer 226 as first transmitted diffracted light $L_{92}$. By allowing the right circularly polarized light $P_R$ component among the incidence ray $L_{91}$ to pass through the first optically anisotropic layer 224, the right circularly polarized light $P_R$ is converted into left circularly polarized light $P_L$ and then emitted. Meanwhile, the left circularly polarized light $P_L$ component among the incidence ray $L_{91}$ is emitted from the second optically anisotropic layer 225 in a state where the left circularly polarized light $P_L$ receives a bending force in the second optically anisotropic layer 225 so that the traveling direction is changed, and the light passes through the first optically anisotropic layer 224 while the diffraction state is maintained and is emitted from the other surface of the optically anisotropic layer 226 as second transmitted diffracted light $L_{93}$. The left circularly polarized light $P_L$ component among the incidence ray $L_{91}$ is converted into the right circularly polarized light $P_R$ by the second optically anisotropic layer 225, passes through the first optically anisotropic layer 224 while the state is maintained, and is emitted. In this example, the first optically anisotropic layer 224 and the second optically anisotropic layer 225 have the same configuration except that the twist properties in the thickness direction are opposite to each other, and thus the traveling directions of the transmitted diffracted light $L_{92}$ and the second transmitted diffracted light $L_{93}$ are substantially line-symmetric with respect to the normal line.

As described above, since the optical element comprises the first optically anisotropic layer and the second optically anisotropic layer having the twist properties exhibiting opposite orientation in the film thickness direction, both the right circularly polarized light $P_R$ and the left circularly polarized light $P_L$ can be diffracted with high diffraction efficiency.

In a case where the optical element comprises the first optically anisotropic layer 224 and the second optically anisotropic layer 225 as in the case of the optical element 220 according to the fourth embodiment, the first disk-like liquid crystal compound and the second disk-like liquid crystal compound may be the same as or different from each other. Further, the 180° rotation period of the horizontal rotational alignment of the first disk-like liquid crystal compound in the first optically anisotropic layer 224 and the 180° rotation period of the horizontal rotational alignment of the second disk-like liquid crystal compound in the second optically anisotropic layer 225 may be the same as or different from each other. In a case where the rotation periods of the horizontal rotational orientation of both optically anisotropic layers are different from each other, diffracted light having different diffraction angles between left circularly polarized light and right circularly polarized light can be obtained.

Further, the wavelength of the incidence ray which can be diffracted can be broadened by laminating optically anisotropic layers having twisted alignment of the disk-like liquid crystal compound in the thickness direction.

The broadening of the wavelength range can be realized not only by forming an optically anisotropic layer having twisted alignment in the film thickness direction but also by forming the optically anisotropic layer using a liquid crystal material in which the birefringence shows inverse dispersion. Therefore, it is preferable that the optically anisotropic layer is formed using a liquid crystal material in which the birefringence shows inverse dispersion. Further, it is also preferable that the optically anisotropic layer has a substantially broadband with respect to the wavelength of the incidence ray by laminating different phase difference layers.

Hereinafter, the constituent components of the optical element according to the embodiment of the present disclosure will be described in detail.

<Optically Anisotropic Layer>

The liquid crystal composition for forming an optically anisotropic layer, which contains a disk-like liquid crystal may contain other components such as a leveling agent, an alignment control agent, a polymerization initiator, and an alignment assistant in addition to the disk-like liquid crystal compound. The optically anisotropic layer which is formed of a cured layer of the liquid crystal composition and in which a predetermined liquid crystal alignment pattern is fixed can be obtained by forming an alignment film on the support, coating the alignment film with the liquid crystal composition, and curing the composition.

Disk-Like Liquid Crystal Compound

Compounds described in JP2007-108732A and JP2010-244038A can be preferably used as disk-like liquid crystal compounds.

Other Components

Known materials can be used as other components such as an alignment control agent, a polymerization initiator, and an alignment assistant. In order to form the optically anisotropic layer according to the second embodiment, a chiral agent is added to obtain a cholesteric liquid crystalline phase in the thickness direction. In addition, a chiral agent is also added in a case of forming the optically anisotropic layer according to the third or fourth embodiment, that is, forming twisted alignment in the thickness direction.

Chiral Agent (Optically Active Compound)

A chiral agent has a function of inducing a helical structure of a cholesteric liquid crystalline phase. The chiral agent may be selected depending on the purpose thereof because the helical twist direction or the helical pitch induced by a compound varies.

The chiral agent is not particularly limited, and known compounds (for example, Liquid Crystal Device Handbook, section 4-3 in Chapter 3, chiral agent for twisted nematic (TN) and super twisted nematic (STN), p. 199, edited by Japan Society for the Promotion of Science, 142th Committee, 1989), isosorbide, and isomannide derivatives can be used.

The chiral agent typically contains asymmetric carbon atoms, but an axially asymmetric compound or planarly asymmetric compound that does not contain asymmetric carbon atoms can also be used as a chiral agent. Examples of the axially asymmetric compound and the planarly asymmetric compound include binaphthyl, helicene, paracyclophane, and derivatives thereof. The chiral agent may contain a polymerizable group. In a case where both the chiral agent and the liquid crystal compound contain a polymerizable group, a polymer having a repeating unit derived from a polymerizable liquid crystal compound and a repeating unit derived from a chiral agent can be formed by the polymerization reaction between the polymerizable chiral agent and the polymerizable liquid crystal compound. In this form, it is preferable that the polymerizable group contained in the polymerizable chiral agent is the same group as the polymerizable group contained in the polymerizable liquid crystal compound. Therefore, as the polymerizable group of the chiral agent, an unsaturated polymerizable group, an epoxy group, or an aziridinyl group is preferable, an unsaturated polymerizable group is more preferable, and an ethylenically unsaturated polymerizable group is still more preferable.

Further, the chiral agent may be a liquid crystal compound.

It is preferable that the chiral agent contains a photoisomerizable group because a pattern of a desired reflection wavelength corresponding to an emission wavelength can be formed by photomask irradiation using actinic rays or the like after application and alignment. As the photoisomerizable group, an isomerizable site of a compound exhibiting photochromic properties, an azo group, an azoxy group, or a cinnamoyl group is preferable. As specific compounds, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A can be used.

Solvent

As a solvent of the liquid crystal composition, an organic solvent is preferably used. Examples of the organic solvent include an amide (such as N,N-dimethylformamide), a sulfoxide (such as dimethyl sulfoxide), a heterocyclic compound (such as pyridine), a hydrocarbon (such as benzene or hexane), an alkyl halide (such as chloroform or dichloromethane), an ester (such as methyl acetate or butyl acetate), a ketone (such as acetone, methyl ethyl ketone, or cyclohexanone), and an ether (such as tetrahydrofuran or 1,2-dimethoxyethane). Among these, an alkyl halide and a ketone are preferable. A combination of two or more kinds of organic solvents may be used.

<Support>

As the support, a transparent support is preferable, and examples thereof include a polyacrylic resin film such as polymethyl methacrylate, a cellulose-based resin film such as cellulose triacetate, and a cycloolefin polymer-based resin [such as "ARTON" (trade name, manufactured by JSR Corporation) or "ZEONOR" (trade name, manufactured by Zeon Corporation)]. The support is not limited to a flexible film, and an inflexible substrate such as a glass substrate may be used.

<Alignment Film for Forming Optically Anisotropic Layer>

Examples of the alignment film for forming an optically anisotropic layer include a rubbed film formed of an organic compound such as a polymer, an obliquely deposited film of an inorganic compound, a film having microgrooves, and a film obtained by accumulating LB films formed of an organic compound such as w-tricosanoic acid, dioctadecyl-methylammonium chloride, or methyl stearate according to the Langmuir-Blodgett method. As the alignment film, an alignment film formed by applying a rubbing treatment to a surface of a polymer layer is preferable. The rubbing treatment is performed by rubbing the surface of the polymer layer several times in a certain direction using paper or cloth. As the kind of the polymer used for the alignment layer, polyimide, polyvinyl alcohol, polymers containing polymerizable groups described in JP1997-152509A (JP-H09-152509A), and orthogonal alignment films described in JP2005-097377A, JP2005-099228A, and JP2005-128503A can be preferably used. Here, the orthogonal alignment film indicates an alignment film in which a major axis of a molecule in the polymerizable rod-like liquid crystal compound is aligned so as to be substantially orthogonal to the rubbing direction of the orthogonal alignment film. The thickness of the alignment layer is not necessarily large as long as the alignment function can be provided, and the thickness thereof is preferably in a range of 0.01 to 5 μm and more preferably in a range of 0.05 to 2 μm.

Further, a so-called photo-alignment film obtained by irradiating a photo-alignment material with polarized light or non-polarized light to obtain an alignment film can also be used. In other words, a photo alignment film may be prepared by coating the support with a photo-alignment material. The photo alignment film can be irradiated with polarized light in the vertical direction or oblique direction, and the photo-alignment film can be irradiated with non-polarized light in an oblique direction.

Preferred examples of the photo-alignment material used for the photo-alignment film which can be used in the optical element according to the embodiment of the present disclosure include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having photo-alignment units described in JP2002-265541A and JP2002-317013A, photo-crosslinking silane derivatives described in JP4205195B and JP4205198B, photo-crosslinked polyimides, polyamides, or esters described in JP2003-520878A, JP2004-529220A, and JP4162850B, and compounds capable of photodimerization, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, JP2014-012823A. Among these, azo compounds, photo-crosslinking polyimides, polyamides, esters, cinnamate compounds, or chalcone compounds are preferable.

In the optical element according to the embodiment of the present invention, it is preferable to use a photo-alignment film.

Figure 13:
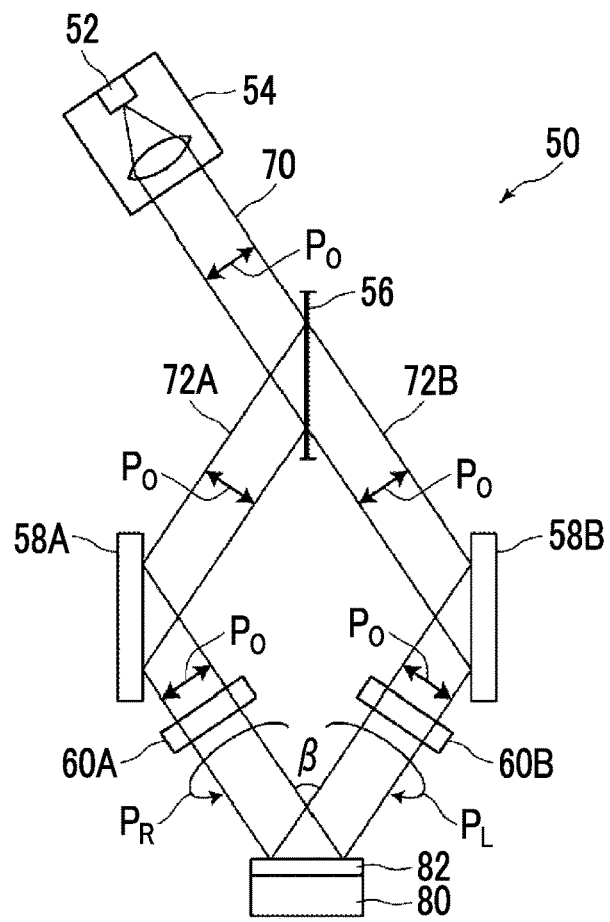
FIG. 13 is a schematic configuration view illustrating an exposure device that irradiates an alignment film with interference light.

The alignment pattern is formed by coating the support with the alignment film, drying the alignment film, and exposing the alignment film to a laser. FIG. 13 is a schematic view illustrating an exposure device for the alignment film. An exposure device 50 comprises a light source 52 comprising a semiconductor laser 54, a beam splitter 56 that separates laser light 70 from the semiconductor laser 52 into two light beams, mirrors 58A and 58B respectively disposed on optical paths of two light beams 72A and 72B, and λ/4 plates 60A and 60B. The 214 plates 60A and 60B each comprise an optical axis, and these optical axes are orthogonal to each other. The λ/4 plate 60A converts linearly polarized light P0 to right circularly polarized light $P_R$, and the λ/4 plate 60B converts linearly polarized light $P_0$ to left circularly polarized light $P_L$.

A support 80 comprising an alignment film 82 is disposed in an exposed portion, two light beams 72A and 72B are allowed to intersect with each other on the alignment film 82 to interfere with each other, the alignment film 82 is irradiated with interference light so as to be exposed to the light. Due to this interference, the polarization state of light to be applied to the alignment film 82 periodically changes in the form of interference fringes. In this manner, an alignment pattern in which the alignment state periodically changes is obtained. In the exposure device 50, the period of the alignment pattern can be changed by changing an intersecting angle β between two light beams 72A and 72B. An optically anisotropic layer comprising a liquid crystal alignment pattern according to this period can be formed by forming the following optically anisotropic layer on the alignment film having an alignment pattern whose alignment state periodically changes.

<Formation of Optically Anisotropic Layer>

The optically anisotropic layer can be formed by multi-layer-coating the alignment film with the liquid crystal composition. The multilayer-coating is performed by coating the alignment film with the liquid crystal composition, heating the composition, cooling the composition, and curing the composition with ultraviolet rays to prepare the first liquid crystal fixing layer. By forming the optically anisotropic layer through multilayer-coating, the alignment direction of the alignment film can be reflected from the lower surface to the upper surface of the optically anisotropic layer even in a case where the total thickness of the optically anisotropic layer increases.

The optically anisotropic layer according to the first embodiment and the optically anisotropic layer according to the second embodiment are different from each other only in terms of the liquid crystal composition, and the same forming method can be employed.

Figure 14:
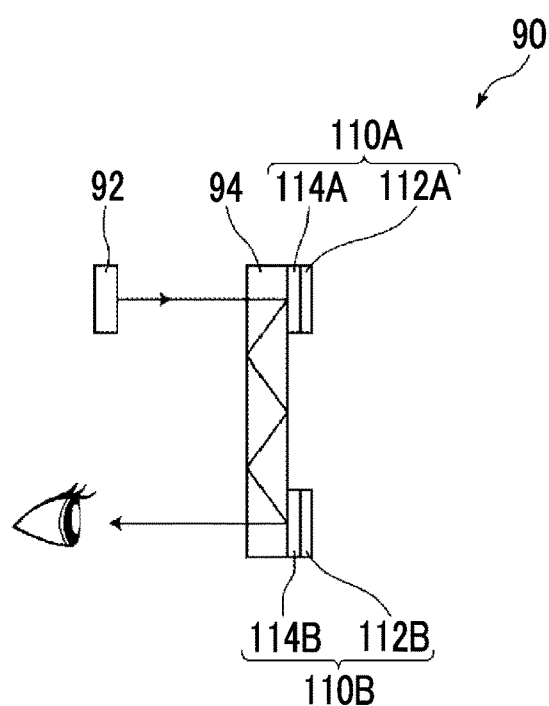
FIG. 14 is a schematic configuration view illustrating a head mounted display which is an example of an optical device.

Next, an example of an optical device comprising the optical element according to the embodiment of the present disclosure will be described. FIG. 14 is a view illustrating the configuration of main portions of a head mounted display 90 which is an example of the optical device.

As illustrated in FIG. 14, the head mounted display 90 comprises a liquid crystal display device 92 which is an embodiment of a light source, and a light guide member 94 which guides light output from the liquid crystal display device 92 and also comprises optical elements 110A and 110B respectively functioning as a reflection type diffraction lattice similar to the optical element according to the second embodiment of the present invention in a portion of the light guide member 94. The liquid crystal display device 92 and the light guide member 94 are disposed such that the light from the liquid crystal display device 92 is perpendicularly incident on the light guide member 94, and the optical element 110A is disposed at a position where the light which has been incident on the light guide member 94 is perpendicularly incident on the surface of the optical element 110A. In addition, the optical element 110B is disposed at a position where the light guided by being totally reflected by the light guide member 94 is incident.

The optical element 110A comprises an optically anisotropic layer 114A on a support 112A and is configured to obliquely reflect specific circularly polarized light having a predetermined center wavelength that is perpendicularly incident on the optically anisotropic layer 114A. The optical element 110B comprises an optically anisotropic layer 114B on a support 112B and is configured to vertically reflect specific circularly polarized light having a predetermined center wavelength incident on the optically anisotropic layer 114B in an oblique direction.

As described above, in a case where the optical element according to the embodiment of the present disclosure is used, since the reflection direction of the incidence ray can be set as a desired direction and it is not necessary to separately provide a reflection element and an element for changing an optical path, the size of the optical device can be reduced.

The optical element according to the embodiment of the present invention is not limited to the application to the head mounted display 90 as described above, but can also be applied to an AR projection device as a light reflecting element that reflects light in a direction different from the incidence angle. Further, as a micromirror or a microlens that condenses or diverges light, the present invention can be applied to a focusing mirror for a sensor or a reflection screen that diffuses light.

EXAMPLES

Hereinafter, the optical element of the embodiment of the present invention will be described based on examples and comparative examples.

First, Examples 1 to 3 and Comparative Examples 1 to 3 of the optical element according to the first embodiment, functioning as a transmission type diffraction lattice will be described.

Examples 1 to 3

Each optical element of Examples 1 to 3 was prepared by forming an alignment film on a support and forming an optically anisotropic layer A-1 formed of a cured layer of a liquid crystal composition D1 containing a disk-like liquid crystal compound on the alignment film. The optically anisotropic layer A-1 had a liquid crystal alignment pattern in which a disk-like liquid crystal compound rotated and was aligned horizontally. In Examples 1 to 3, the rotation periods p of the liquid crystal alignment patterns in the optically anisotropic layers were different from each other.

Preparation of Optical Elements of Examples 1 to 3

A commercially available triacetyl cellulose film "Z-TAC" (manufactured by Fujifilm Corporation) was used as the support.

(Saponification of Support)

The support was allowed to pass through a dielectric heating roll having a temperature of 60° C., and the surface temperature of the support was increased to 40° C. Thereafter, one surface of the support was coated with an alkali solution described below with a coating amount of 14 mL/m² using a bar coater, and the support was heated to 110° C. and transported under a steam type far infrared heater (manufactured by Noritake Co., Ltd.) for 10 seconds. Next, the surface of the support was coated with 3 mL/m² of pure water using the same bar coater. Next, the support was washed with water using a fountain coater and drained using an air knife three times, a drying zone at 70° C. was transported for 10 seconds so that the support was dried, thereby obtaining an alkali-saponified support.

<Alkali Solution>

Potassium hydroxide 4.70 parts by mass
Water 15.80 parts by mass
Isopropanol 63.70 parts by mass
Surfactant
SF-1: $C_{14}H_{29}O(CH_2CH_2O)_2OH$ 1.0 parts by mass Propylene glycol 14.8 parts by mass (Formation of Undercoat Layer)

The alkali-saponified support was continuously coated with the following coating solution for forming an undercoat layer using a #8 wire bar. The support on which the coated film was formed was dried with hot air at 60° C. for 60 seconds and further dried with hot air at 100° C. for 120 seconds, thereby forming an undercoat layer.

| <Coating solution for forming undercoat layer> | |
|---|---|
| Modified polyvinyl alcohol shown below | 2.40 parts by mass |
| Isopropyl alcohol | 1.60 parts by mass |
| Methanol | 36.00 parts by mass |
| Water | 60.00 parts by mass |

Modified polyvinyl alcohol

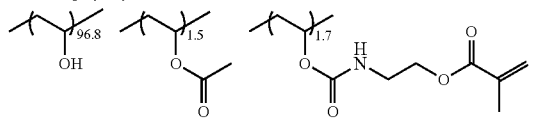

(Formation of Alignment Film P-1)

The support on which the above-described undercoat layer was formed was continuously coated with the following coating solution for forming an alignment film P-1 using a #2 wire bar. The support on which the coated film formed of the coating solution for forming the alignment film P-1 was formed was dried with hot air at 60° C. for 60, thereby forming an alignment film P-1.

| <Coating solution for forming alignment film P-1> | |
|---|---|
| Material for photo-alignment shown below | 1.00 parts by mass |
| Water | 16.00 parts by mass |
| Butoxy ethanol | 42.00 parts by mass |
| Propylene glycol monomethyl ether | 42.00 parts by mass |

-Material for photo-alignment-

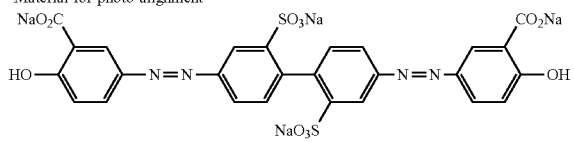

(Exposure of Alignment Film P-1)

The alignment film was exposed using the exposure device 50 illustrated in FIG. 13. An exposure device emitting laser light having a wavelength (405 nm) as semiconductor layer 52 was used as the exposure device 50. The amount of exposure to interference light was set to 100 mJ/cm$^2$. Further, the 180° rotation period of a pattern formed by the interference between two laser light beams was controlled by changing an intersecting angle β between two light beams.

(Formation of Optically Anisotropic Layer A-1)

First, the following liquid crystal composition D1 was prepared.

| <Liquid crystal composition D1> | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |
| MEGAFACE F444 (manufactured by DIC Corporation) | 0.50 parts by mass |
| Methyl ethyl ketone | 300.00 parts by mass |

Disk-like liquid crystal compound L-2

Disk-like liquid crystal compound L3

Further, the complex refractive index Δn of the cured layer of the liquid crystal composition D1 was 0.15. The complex refractive index Δn was acquired by measuring the retardation value and the film thickness of the liquid crystal fixed layer (cured layer) obtained by coating a support provided with an alignment film for measuring the retardation which was separately provided with the liquid crystal composition D1, aligning the director of the disk-like liquid crystal compound to be horizontal to the base material, and performing irradiation with ultraviolet rays for fixation. Further, the complex refractive index Δn can be calculated by dividing the retardation value by the film thickness. The retardation value was measured at a wavelength of 550 nm by Axoscan (manufactured by Axometrics, Inc.), and the film thickness was measured using a scanning electron microscope (SEM).

<Formation of Coating of Optically Anisotropic Layer A-1>

An optically anisotropic layer A-1 was formed by multi-layer-coating the alignment film P-1 with the following liquid crystal composition D1. The multilayer-coating was performed by coating the alignment film with the first liquid crystal composition D1, heating the composition, cooling the composition, and curing the composition with ultraviolet rays to prepare the liquid crystal fixing layer. The second and subsequent liquid crystal fixing layers were obtained by repeating the processes of coating the liquid crystal fixing layer with the composition through overcoating, heating the composition, cooling the composition, and curing the composition using ultraviolet rays. By forming the optically anisotropic layer through multilayer-coating, the alignment direction of the alignment film can be reflected from the lower surface to the upper surface of the liquid crystal layer even in a case where the total thickness of the liquid crystal layer increases.

First, as the first layer, the coated film obtained by coating the alignment film P-1 with the following liquid crystal composition D1 was heated on a hot plate at 110° C. and then cooled to 60° C., and the coated film was irradiated with ultraviolet rays having a wavelength of 365 nm at an irradiation dose of 100 mJ/cm$^2$ using a high pressure mercury lamp in a nitrogen atmosphere, thereby fixing the orientation of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition D1 through overcoating, heating and cooling the composition under the same conditions as described above, and then curing the composition using ultraviolet rays. In this manner, an optically anisotropic layer A-1 was obtained by repeating the overcoating until the total thickness reached a desired film thickness. Finally, it was confirmed that the birefringence of the liquid crystal was 275 nm (=λ/2) and the surface was periodically aligned using a polarizing microscope.

Comparative Examples 1 to 3

In contrast to Examples 1 to 3, each optical element comprising an optically anisotropic layer A-2 formed of a cured layer of a liquid crystal composition E1 containing a rod-like liquid crystal compound in place of the disk-like liquid crystal compound was obtained. That is, in the optical elements of Comparative Examples 1 to 3, the optically anisotropic layer had a liquid crystal alignment pattern in which rod-like liquid crystals rotated and were aligned horizontally.

Preparation of Optical Elements of Comparative Examples 1 to 3

In contrast to Examples 1 to 3, each optical element of Comparative Examples 1 to 3 was prepared in the same manner as in Examples 1 to 3 except that the optically anisotropic layer A-2 was formed using the liquid crystal composition D1 as the liquid crystal composition E1.

(Formation of Optically Anisotropic Layer A-2)

A liquid crystal composition E1 with the following composition was prepared.

| <Liquid crystal composition E1> | |
|---|---|
| Rod-like liquid crystal compound L-1 | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |
| Leveling agent T-1 | 0.08 parts by mass |
| Methyl ethyl ketone | 296.50 parts by mass |

-Rod-like liquid crystal compound L-1-

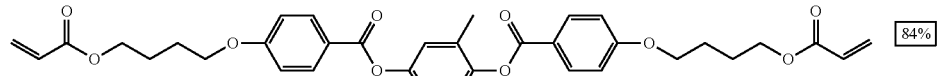

-Leveling agent T-1-

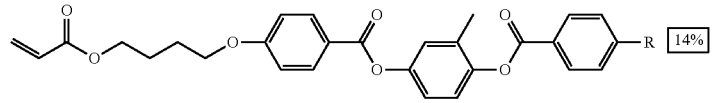

The complex refractive index Δn of the cured layer of the liquid crystal composition E1 was 0.15. The complex refractive index Δn was acquired according to the same method as in the case of the liquid crystal composition D1.

<Formation of Coating of Optically Anisotropic Layer A-2>

First, as the first layer, the coated film obtained by coating the alignment film P-1 with the above-described liquid crystal composition E1 was heated on a hot plate at 110° C. and then cooled to 60° C., and the coated film was irradiated with ultraviolet rays having a wavelength of 365 nm at an irradiation dose of 100 mJ/cm² using a high pressure mercury lamp in a nitrogen atmosphere, thereby fixing the orientation of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition E1 through overcoating, heating and cooling the composition under the same conditions as described above, and then curing the composition using ultraviolet rays. In this manner, an optically anisotropic layer A-2 was obtained by repeating the overcoating until the total thickness reached a desired film thickness. Finally, it was confirmed that the birefringence of the liquid crystal was 275 nm (=λ/2) and the surface was periodically aligned using a polarizing microscope.

[Evaluation]

Measurement of Diffraction Angle

For each of the optical elements of Examples 1 to 3 and Comparative Examples 1 to 3, light was perpendicularly incident on the surface of the optically anisotropic layer through the support of the optical element, and the diffraction angle of the transmitted diffracted light was measured. Specifically, the diffraction angle was calculated by allowing laser light as right circularly polarized light having an output center wavelength of 550 nm to be perpendicularly incident on one surface of the optical element, that is, one surface of the optically anisotropic layer from the position separated by 50 cm in the normal direction and capturing the spot of the transmitted diffracted light using a screen disposed at a distance of 50 cm from the other surface of the optical element.

Measurement of Light Intensity

Figure 15:
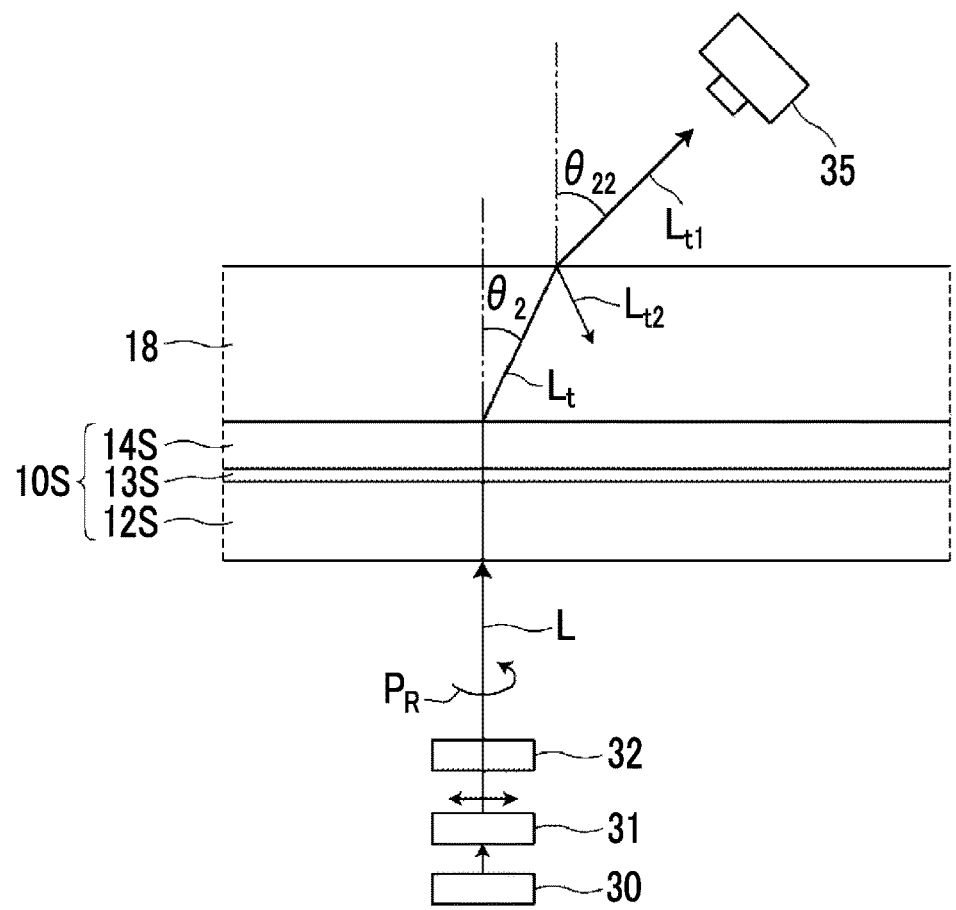
FIG. 15 is a view for explaining a method of measuring the light intensity of a transmission type optical element.

A method for measuring the light intensity will be described with reference to FIG. 15. The optical element 10S of each example and each comparative example comprises an optically anisotropic layer 14S on an alignment film 13S comprised on the surface of a support 12S. A second support 18 having a refractive index substantially the same as that of the support 12S was adhered to one surface of the optically anisotropic layer 14S opposite to the surface of the alignment film 13S side where one surface of the optically anisotropic layer 14S was provided to obtain a sample for measurement.

Semiconductor laser light having a wavelength of 550 nm emitted from the semiconductor laser 30 was transmitted through a linear polarizer 31 and a λ/4 plate 32 to obtain light L of right circularly polarized light $P_R$. By allowing the light L to be perpendicularly incident on the support 12S, the light L was perpendicularly incident on one surface of the optically anisotropic layer 14S. In this case, the diffracted light $L_t$ having a diffraction angle θ2 was output from the other surface of the optically anisotropic layer 14S by the diffraction action of the optically anisotropic layer 14S. The diffracted light $L_t$ traveled through the second support 18 connected to the other surface of the optically anisotropic layer 14S and was emitted from the surface of the sample to the atmosphere. The light intensity of the emitted light $L_{t1}$ was measured by a photodetector 35. The diffracted light $L_t$ was bent due to a difference in refractive index at the interface between the sample and the atmosphere so that emitted light $L_{t1}$ emitted at an emission angle $θ_{22}$ and reflected light $L_{t2}$ reflected inside the second support 18 were generated. The light intensity detected by the photodetector 35 and the light intensity of the light $L_{r2}$ internally reflected according to the Fresnel rule were acquired, and the light intensity of the diffracted light $L_t$ was calculated.

Further, the relative light intensity value of the diffracted light $L_t$ with respect to the incidence ray was acquired by calculating the ratio between the light intensity of the diffracted light $L_t$ and the light intensity of the light L.

The configurations and the evaluation results of the optical elements of Examples 1 to 3 and Comparative Examples 1 to 3 are listed in Table 1.

Examples 1 to 3 except that an optically anisotropic layer having a cholesteric phase and a liquid crystal alignment pattern was formed using the liquid crystal composition D1 as the liquid crystal composition D2. It was confirmed that the liquid crystal alignment pattern had a cholesteric phase based on the cross section of the optical element using an SEM and also confirmed that the pattern was formed due to the alignment of the disk-like liquid crystal compound by performing measurement using Axoscan (manufactured by Axometrics, Inc.).

TABLE 1

| Transmission type optical element | | | Comparative Example 1 | Example 1 | Comparative Example 2 | Example 2 | Comparative Example 3 | Example 3 |
|---|---|---|---|---|---|---|---|---|
| Configuration | Optically anisotropic layer | Kind of liquid crystal | Rod-like | Disk-like | Rod-like | Disk-like | Rod-like | Disk-like |
| | | Form of alignment | Horizontal rotation alignment | Horizontal rotation alignment | Horizontal rotation alignment | Horizontal rotation alignment | Horizontal rotation alignment | Horizontal rotation alignment |
| | | $\Delta n$ | 0.15 | 0.15 | 0.15 | 0.15 | 0.15 | 0.15 |
| | | Film thickness (μm) | 1.83 | 1.83 | 1.83 | 1.83 | 1.83 | 1.83 |
| | | Retardation (nm) | 275 | 275 | 275 | 275 | 275 | 275 |
| | | Rotation period p (μm) | 1.6 | 1.6 | 1 | 1 | 0.7 | 0.7 |
| Evaluation | | Diffraction angle (° C.) | 20 | 20 | 33 | 33 | 52 | 52 |
| | | Relative light intensity value | 0.95 | 0.97 | 0.67 | 0.73 | 0.11 | 0.18 |
| | | Rate of increase in light intensity with respect to comparative example | — | 2% | — | 9% | — | 64% |

As listed in Table 1, in a case where the rotation period p was the same, the diffraction angle formed by the horizontal rotational alignment pattern was the same regardless of whether the rod-like liquid crystal compound or the disk-like liquid crystal compound was used. However, the relative light intensity value was higher in the examples in which the optically anisotropic layer having the horizontal rotational alignment pattern of the disk-like liquid crystal compound was comprised than in the comparative examples. This effect became more significant as the diffraction angle increased.

Next, the optical element according to the second embodiment, functioning as a reflection type diffraction lattice, in Examples 11 to 13 and Comparative Examples 11 to 13 will be described.

Examples 11 to 13

Each optical element of Examples 11 to 13 was prepared by forming an alignment film on a support and forming an optically anisotropic layer A-3 formed of a cured layer of a liquid crystal composition D2 containing a disk-like liquid crystal compound on the alignment film. The optically anisotropic layer had a liquid crystal alignment pattern in which a disk-like liquid crystal compound rotated and was aligned horizontally and which had a cholesteric phase in the thickness direction. In Examples 11 to 13, the rotation periods p of the liquid crystal alignment patterns in the optically anisotropic layers were different from each other.

Preparation of Optical Elements of Examples 11 to 13

In contrast to Examples 1 to 3, each optical element of Examples 11 to 13 was prepared in the same manner as in <Liquid crystal composition D2>

| | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |
| Chiral agent Ch-2 | 3.79 parts by mass |
| MEGAFACE F444 (manufactured by DIC Corporation) | 0.50 parts by mass |
| Methyl ethyl ketone | 255.00 parts by mass |

-Chiral agent Ch-2-

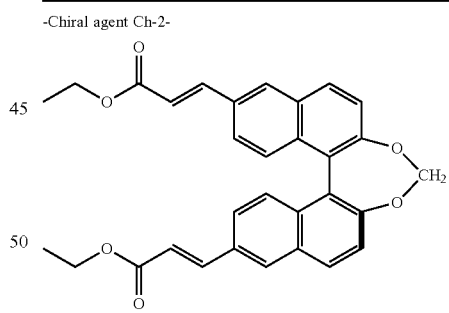

(Formation of Optically Anisotropic Layer A-3)

The optically anisotropic layer A-3 was formed by multilayer-coating the alignment film P-1 with the liquid crystal composition D2.

First, as the first layer, the coated film obtained by coating the alignment film P-1 with the following liquid crystal composition D2 was heated on a hot plate at 95° C. and then cooled to 25° C., and the coated film was irradiated with ultraviolet rays having a wavelength of 365 nm at an irradiation dose of 100 mJ/cm² using a high pressure mercury lamp in a nitrogen atmosphere, thereby fixing the orientation of the liquid crystal compound. At this time, the film thickness of the fixed liquid crystal layer (one liquid crystal fixing layer) was 0.2 µm.

The second and subsequent liquid crystal fixing layers were formed by coating the previously formed liquid crystal fixing layer with the liquid crystal composition D2 through overcoating, heating and cooling the composition under the same conditions as described above, and then curing the composition using ultraviolet rays. In this manner, an optically anisotropic layer A-3 was obtained by repeating the overcoating until the total thickness reached a desired film thickness. Further, it was confirmed that a periodically oriented surface was formed using a polarizing microscope and an SEM.

Comparative Examples 11 to 13

In contrast to Examples 11 to 13, each optical element comprising an optically anisotropic layer A-4 formed of a cured layer of a liquid crystal composition E2 containing a rod-like liquid crystal compound in place of the disk-like liquid crystal compound was obtained. That is, in the optical elements of Comparative Examples 11 to 13, the optically anisotropic layer had a liquid crystal alignment pattern in which rod-like liquid crystals rotated and were aligned horizontally and which had a cholesteric phase in the thickness direction.

Preparation of Optical Elements of Comparative Examples 11 to 13

In contrast to Examples 11 to 13, each optical element of Comparative Examples 11 to 13 was prepared in the same manner as in Examples 11 to 13 except that the optically anisotropic layer A-4 was formed using the liquid crystal composition D2 as the liquid crystal composition E2.

(Formation of Optically Anisotropic Layer A-4)

A liquid crystal composition E2 with the following composition was prepared.

<Formation of Coating of Optically Anisotropic Layer A-4>

An optically anisotropic layer was formed by multilayer-coating the alignment film P-1 with the liquid crystal composition E2 in place of the liquid crystal composition D2 in Example 11.

First, as the first layer, the coated film obtained by coating the alignment film P-1 with the following liquid crystal composition E2 was heated on a hot plate at 95° C. and then cooled to 25° C., and the coated film was irradiated with ultraviolet rays having a wavelength of 365 nm at an irradiation dose of 100 mJ/cm² using a high pressure mercury lamp in a nitrogen atmosphere, thereby fixing the orientation of the liquid crystal compound. At this time, the film thickness of the fixed liquid crystal layer (one liquid crystal fixing layer) was 0.2 µm.

The second and subsequent liquid crystal fixing layers were formed by coating the previously formed liquid crystal fixing layer with the liquid crystal composition E2 through overcoating, heating and cooling the composition under the same conditions as described above, and then curing the composition using ultraviolet rays. In this manner, an optically anisotropic layer A-4 was obtained by repeating the overcoating until the total thickness reached a desired film thickness. Further, it was confirmed that a periodically oriented surface was formed using a polarizing microscope and an SEM.

[Evaluation]

Measurement of Diffraction Angle

For each of the optical elements of Examples 11 to 13 and Comparative Examples 11 to 13, light was perpendicularly incident on the surface of the optically anisotropic layer through the support of the optical element, and the diffraction angle of the transmitted diffracted light was measured. Specifically, the diffraction angle was calculated by allowing laser light as right circularly polarized light having an output center wavelength of 550 nm to be perpendicularly incident on one surface of the optical element, that is, one surface of the optically anisotropic layer from the position separated by 50 cm in the normal direction and capturing the spot of the reflected diffracted light using a screen disposed at a distance of 50 cm from one surface of the optical element.

Measurement of Light Intensity

Figure 16:
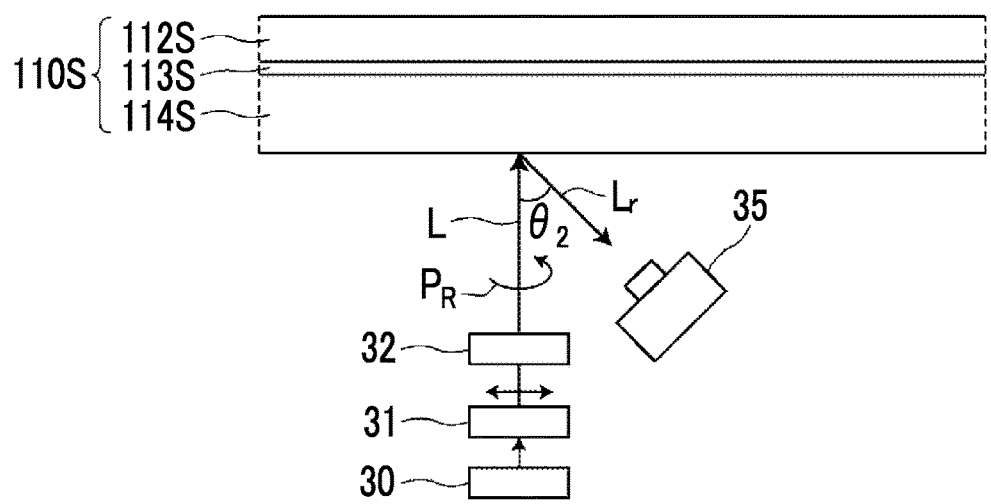
FIG. 16 is a view for explaining a method of measuring the light intensity of a reflection type optical element.

A method of measuring the light intensity will be described with reference to FIG. 16.

Semiconductor laser light having a wavelength of 550 nm emitted from the semiconductor laser 30 was transmitted through a linear polarizer 31 and a λ/4 plate 32 to obtain light L of right circularly polarized light $P_R$. The light L was allowed to be perpendicularly incident on the surface of an optically anisotropic layer 114S comprised on a support 112S through an alignment film 113A. In this case, the light intensity of the diffracted light Lr reflected and diffracted at a diffraction angle λ/2 by the diffraction action and the selective reflection action of the optically anisotropic layer 114S was measured by the photodetector 35. Further, the relative light intensity value of the diffracted light Lr with respect to the incidence ray was acquired by calculating the

| <Liquid crystal composition E2> | |
|---|---|
| Rod-like liquid crystal compound L-1 | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |
| Chiral agent Ch-1 | 5.45 parts by mass |
| Leveling agent T-1 | 0.08 parts by mass |
| Methyl ethyl ketone | 268.20 parts by mass |

-Chiral agent Ch-1-

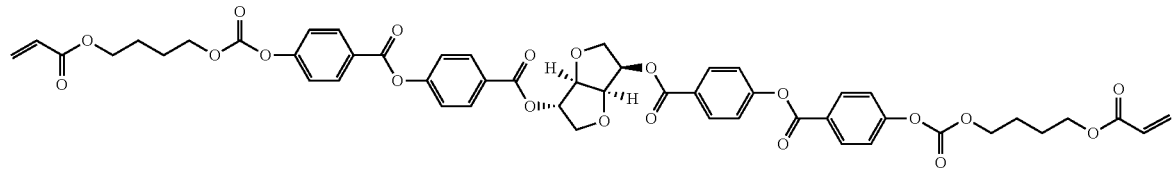 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

ratio between the light intensity of the diffracted light Lr and the light intensity of the light L.

The configurations and the evaluation results of the optical elements of Examples 11 to 13 and Comparative Examples 11 to 13 are listed in Table 2.

the disk-like liquid crystal compound by performing measurement using Axoscan (manufactured by Axometrics, Inc.). As the result, Δnd of the prepared optical element was 275 nm, and the twist angle of the twisted alignment in the thickness direction was 75 degrees.

TABLE 2

| Reflection type optical element | | | Comparative Example 11 | Example 11 | Comparative Example 12 | Example 12 | Comparative Example 13 | Example 13 |
|---|---|---|---|---|---|---|---|---|
| Configuration | Optically anisotropic layer | Diffraction angle (° C.) Relative light intensity value | Rod-like Horizontal rotation alignment + cholesteric alignment | Disk-like Horizontal rotation alignment + cholesteric alignment | Rod-like Horizontal rotation alignment + cholesteric alignment | Disk-like Horizontal rotation alignment + cholesteric alignment | Rod-like Horizontal rotation alignment + cholesteric alignment | Disk-like Horizontal rotation alignment + cholesteric alignment |
| | | Δn | 0.15 | 0.15 | 0.15 | 0.15 | 0.15 | 0.15 |
| | | Film thickness (μm) | 4.5 | 4.5 | 4.5 | 4.5 | 4.5 | 4.5 |
| | | Cholesteric pitch (μm) | 0.35 | 0.35 | 0.35 | 0.35 | 0.35 | 0.35 |
| | | Rotation period p (μm) | 1.6 | 1.6 | 1 | 1 | 0.7 | 0.7 |
| Evaluation | | Diffraction angle (° C.) | 20 | 20 | 33 | 33 | 52 | 52 |
| | | Relative light intensity value | 0.96 | 0.98 | 0.94 | 0.97 | 0.91 | 0.96 |
| | | Rate of increase in light intensity with respect to comparative example | — | 2% | — | 3% | — | 5% |

As listed in Table 2, in a case where the rotation period p was the same, the diffraction angle formed by the horizontal rotational alignment pattern was the same regardless of whether the rod-like liquid crystal compound or the disk-like liquid crystal compound was used. However, the relative light intensity value was higher in the examples in which the optically anisotropic layer having the horizontal rotational alignment pattern of the disk-like liquid crystal compound was comprised than in the comparative examples. By using the disk-like liquid crystal compound, this effect became more significant as the diffraction angle increased.

Example 21

In contrast to Example 2, an optical element of Example 21 was prepared in the same manner as in Example 2 except that an optically anisotropic layer having a liquid crystal alignment pattern with a twist property in the thickness direction was formed using the liquid crystal composition D1 as a liquid crystal composition D21.

| <Liquid crystal composition D21> | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |
| MEGAFACE F444 (manufactured by DIC Corporation) | 0.50 parts by mass |
| Chiral agent Ch-2 | 0.14 parts by mass |
| Methyl ethyl ketone | 300.00 parts by mass |

It was confirmed that the liquid crystal alignment pattern had a twist property based on the cross section of the optical element using an SEM and also confirmed that the liquid crystal alignment pattern was formed due to the alignment of Example 22

After a first optically anisotropic layer (first region) having a liquid crystal alignment pattern having a twist property in the thickness direction was formed using the same liquid crystal composition D21 as in Example 21, a second optically anisotropic layer (second region) was formed by coating the layer with the following liquid crystal composition D22 through overcoating to form an optically anisotropic layer obtained by laminating the first optically anisotropic layer formed of the liquid crystal composition D21 and the second optically anisotropic layer formed of the liquid crystal composition D22. The liquid crystal composition D22 is a liquid crystal composition for forming a second optically anisotropic layer having a liquid crystal alignment pattern having left-right opposite twist properties with respect to the liquid crystal composition D21. In this manner, an optical element of Example 22 was prepared.

| <Liquid crystal composition D22> | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |
| MEGAFACE F444 (manufactured by DIC Corporation) | 0.50 parts by mass |
| Chiral agent Ch-3 | 0.14 parts by mass |
| Methyl ethyl ketone | 300.00 parts by mass |

<Liquid crystal composition D22>

-Chiral agent Ch-3-

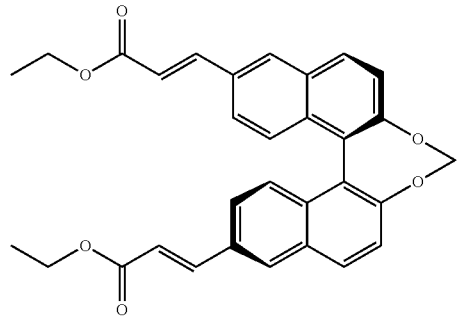

It was confirmed the liquid crystal alignment pattern having a twist property was formed by laminating two layers based on the cross section of the optical element using an SEM. In addition, it was confirmed that the liquid crystal alignment pattern was formed due to the alignment of the disk-like liquid crystal compound by performing measurement using Axoscan (manufactured by Axometrics, Inc.). The prepared optical element had a configuration in which two layers were laminated. Further, Δnd of the first layer was 275 nm and the twist angle thereof was 75 degrees, and Δnd of the second layer was 275 nm and the twist angle thereof was −75 degrees.

As the evaluation of Examples 21 and 22, measurement of the diffraction angle and measurement of the light intensity were performed in the same manner as in Examples 1 to 3. In addition, the diffraction angle and the light intensity were measured in a case where laser light of left circularly polarized light was used as the measurement light.

The configurations and the evaluation results of the optical elements of Examples 21 and 22 are listed in Table 3.

rotational alignment pattern of the rod-like liquid crystal compound Further, in Examples 21 and 22, the rate of increase in light intensity with respect to Comparative Example 2 was greatly improved as compared with Example 2 in which the optically anisotropic layer did not have a twisted alignment pattern in the thickness direction. Further, in the case of using laser light of left circularly polarized light, diffracted light was not obtained in Example 21. In Example 22, laser light of right circularly polarized light and −33° diffracted light symmetric with respect to the normal line were obtained. In Example 22, the intensity of the diffracted light in the case of right circularly polarized light was approximately the same as the intensity of diffracted light in the case of left circularly polarized light.

The disclosures of JP2017-218513 filed on Nov. 13, 2017 and JP2018-096570 filed on May 18, 2018 are incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:
1. An optical element comprising:
a first optically anisotropic layer which is a cured layer of a liquid crystal composition containing a first disk-like liquid crystal compound,
wherein an optical axis of the first disk-like liquid crystal compound is parallel to a surface of the first optically anisotropic layer,
the first optically anisotropic layer has a liquid crystal alignment pattern which is disposed along at least one direction in a plane of the first optically anisotropic layer and in which an orientation of the optical axis of the first disk-like liquid crystal compound rotationally changes continuously, and

TABLE 3

| | Transmission type optical element | | Example 21 | Example 22 | |
|---|---|---|---|---|---|
| Configuration | Optically anisotropic layer | Kind of liquid crystal | Disk-like | Disk-like | |
| | | Form of alignment | Horizontal rotation alignment + twisted alignment | First region Horizontal rotation alignment + twisted alignment | Second region Horizontal rotation alignment + opposite twisted alignment |
| | | Δn | 0.15 | 0.15 | 0.15 |
| | | Film thickness (μm) | 1.83 | 1.83 | 1.83 |
| | | Retardation (nm) | 275 | 275 | 275 |
| | | Rotation period p (μm) | 1 | 1 | 1 |
| Evaluation | Right circularly polarized light | Diffraction angle (°) | 33 | 33 | |
| | | Relative light intensity value | 0.80 | 0.81 | |
| | | Rate of increase in light intensity with respect to Comparative Example 2 | 20% | 21% | |
| | | Diffraction angle (°) in case where left circularly polarized light is incident | — | −33 | |

As listed in Table 3, in both Examples 21 and 22, it was found that the optically anisotropic layer had the horizontal rotational alignment pattern of the disk-like liquid crystal compound similar to Example 2, and the rate of increase in light intensity was higher than that of Comparative Example 2 in which the optically anisotropic layer had a horizontal the orientation of the optical axis rotates by 180° with a period of 0.5 μm to 5 μm,
wherein the first disk-like liquid crystal compound in the first optically anisotropic layer is cholesterically aligned in a thickness direction.

* * * * *